United States Patent
Torghele et al.

(10) Patent No.: US 6,915,734 B2
(45) Date of Patent: Jul. 12, 2005

(54) PIZZA MAKING METHOD AND SYSTEM

(75) Inventors: Claudio Torghele, Viganello (CH);
Pierluigi Malfatti, Rovereto (IT)

(73) Assignee: Arios, S.A., Lugano (CH)

( * ) Notice: Subject to any disclaimer, the term of this patent is extended or adjusted under 35 U.S.C. 154(b) by 160 days.

(21) Appl. No.: 10/040,950

(22) Filed: Jan. 7, 2002

(65) Prior Publication Data

US 2002/0176921 A1 Nov. 28, 2002

Related U.S. Application Data

(63) Continuation-in-part of application No. 09/832,409, filed on Apr. 11, 2001, now Pat. No. 6,546,847, which is a division of application No. 09/294,702, filed on Apr. 19, 1999, now Pat. No. 6,245,370, which is a continuation-in-part of application No. PCT/EP98/05093, filed on Aug. 12, 1998, application No. 10/040,950, which is a continuation-in-part of application No. PCT/EP01/04656, filed on Apr. 25, 2001.

(60) Provisional application No. 60/297,160, filed on Jun. 8, 2001.

(30) Foreign Application Priority Data

Aug. 19, 1997 (IT) ........................................ BZ97A0044
May 5, 2000 (EP) ............................................ 00109611
Jun. 5, 2001 (EP) ............................................ 01113720
Jun. 7, 2001 (IT) ..................................... BZ2001A0033

(51) Int. Cl.⁷ ................................................. A21C 1/06
(52) U.S. Cl. .............................. 99/348; 99/349; 99/353; 99/386; 99/443 C
(58) Field of Search ...................... 99/345, 348, 349, 99/353, 355, 386, 443 C, 450.6

(56) References Cited

U.S. PATENT DOCUMENTS

| | | | |
|---|---|---|---|
| 3,631,818 A | 1/1972 | Zito | 99/450.7 |
| 3,682,106 A | 8/1972 | Kuhlman | 107/1 |
| 3,735,692 A | 5/1973 | Marchignoni | 99/353 |
| 4,010,932 A | 3/1977 | Otto | 259/6 |

(Continued)

FOREIGN PATENT DOCUMENTS

| | | |
|---|---|---|
| AU | 62443/86 | 8/1986 |
| DE | 200 01 194 U1 | 8/2000 |

(Continued)

*Primary Examiner*—Drew Becker
(74) *Attorney, Agent, or Firm*—Woodcock Washburn LLP

(57) ABSTRACT

The invention provides an automated method and apparatus for pizza production which is initiated by individual order placement and uses only fresh ingredients (no ingredients are frozen, pre-prepared or pre-cooked). Each dough portion is individually and mechanically prepared from flour and other fresh, pre-proportioned ingredients. The dough portion passes through a series of shaping and pre-heating processing stations to prepare a flattened and partially baked pizza base. Using a preheated or continuously heated conveying tray, the pizza base passes under a number of metering and distribution devices for selected application of tomato sauce and/or various other toppings according to the order. Baking occurs in one of multiple ovens to complete pizza preparation. Multiple ovens are provided to facilitate the automated preparation of multiple pizzas at any given time. A tray conveying system transports one or more trays through the various processing stations to accommodate multiple orders at the same time.

54 Claims, 26 Drawing Sheets

U.S. PATENT DOCUMENTS

| | | | |
|---|---|---|---|
| 4,087,079 A | 5/1978 | Kramer | 366/131 |
| 4,093,506 A | 6/1978 | Richter | 162/17 |
| 4,331,858 A | 5/1982 | Wagner | 219/405 |
| 4,417,867 A | 11/1983 | Bauer | 425/394 |
| 4,630,930 A | 12/1986 | Seiling | 366/77 |
| 4,723,614 A | 2/1988 | Lahti | 177/120 |
| 4,749,581 A | 6/1988 | Gorsuch et al. | 426/505 |
| 4,771,913 A | 9/1988 | Johndrow et al. | 221/150 |
| 5,113,754 A | 5/1992 | Robinson et al. | 99/326 |
| 5,121,677 A | 6/1992 | LeClaire et al. | 99/357 |
| 5,126,159 A | 6/1992 | Manser et al. | 426/549 |
| 5,144,879 A | 9/1992 | Alessi | 99/327 |
| 5,158,782 A | 10/1992 | Hayashi et al. | 425/135 |
| 5,322,368 A | 6/1994 | Tanaka et al. | 366/76 |
| 5,400,699 A | 3/1995 | Cailbault | 99/357 |
| 5,486,049 A | 1/1996 | Boatman et al. | 366/175.2 |
| 5,512,312 A | 4/1996 | Forney et al. | 426/523 |
| 5,630,358 A | 5/1997 | Patel | 99/349 |
| 5,921,170 A | 7/1999 | Khatchadourian et al. | 99/349 |
| 5,967,023 A * | 10/1999 | Acknin et al. | 99/348 |
| 5,997,924 A * | 12/1999 | Olander et al. | 426/296 |
| 6,156,364 A * | 12/2000 | Meibach | 426/496 |
| 6,245,370 B1 | 6/2001 | Pilati et al. | 426/289 |
| 6,327,968 B1 * | 12/2001 | Scannell | 99/353 |
| 6,546,847 B2 * | 4/2003 | Pilati et al. | 99/348 |
| 2001/0024671 A1 | 9/2001 | Pilati, et al. | 426/289 |

FOREIGN PATENT DOCUMENTS

| | | |
|---|---|---|
| EP | 0 056 346 A1 | 7/1982 |
| EP | 0 554 926 A1 | 8/1993 |
| EP | 0 708 421 A1 | 4/1996 |
| EP | 1 151 788 A1 | 11/2001 |
| GB | 237889 | 2/1926 |
| WO | WO 90/13229 | 11/1990 |
| WO | WO 96/32844 | 10/1996 |
| WO | WO 98/04137 | 2/1998 |
| WO | WO 99/08537 | 2/1999 |

* cited by examiner

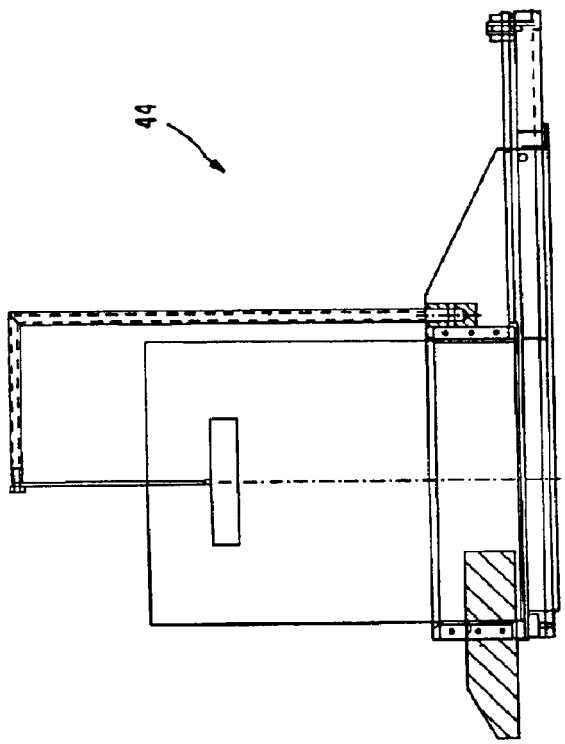
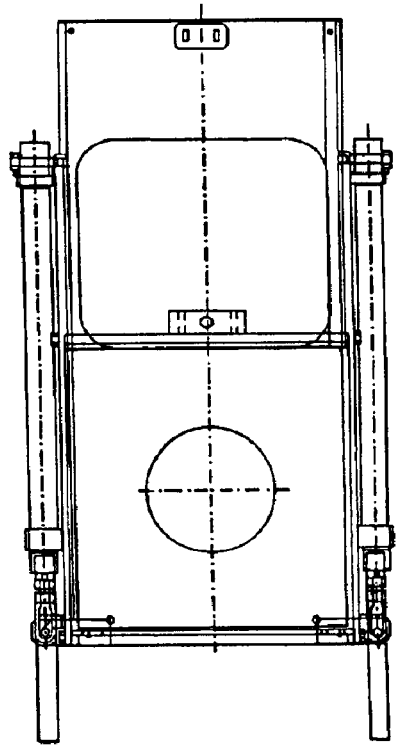
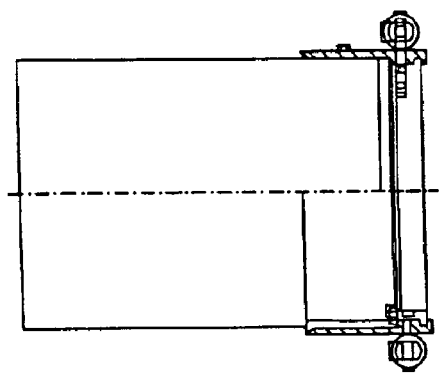
FIG. 12b
FIG. 12c
FIG. 12a

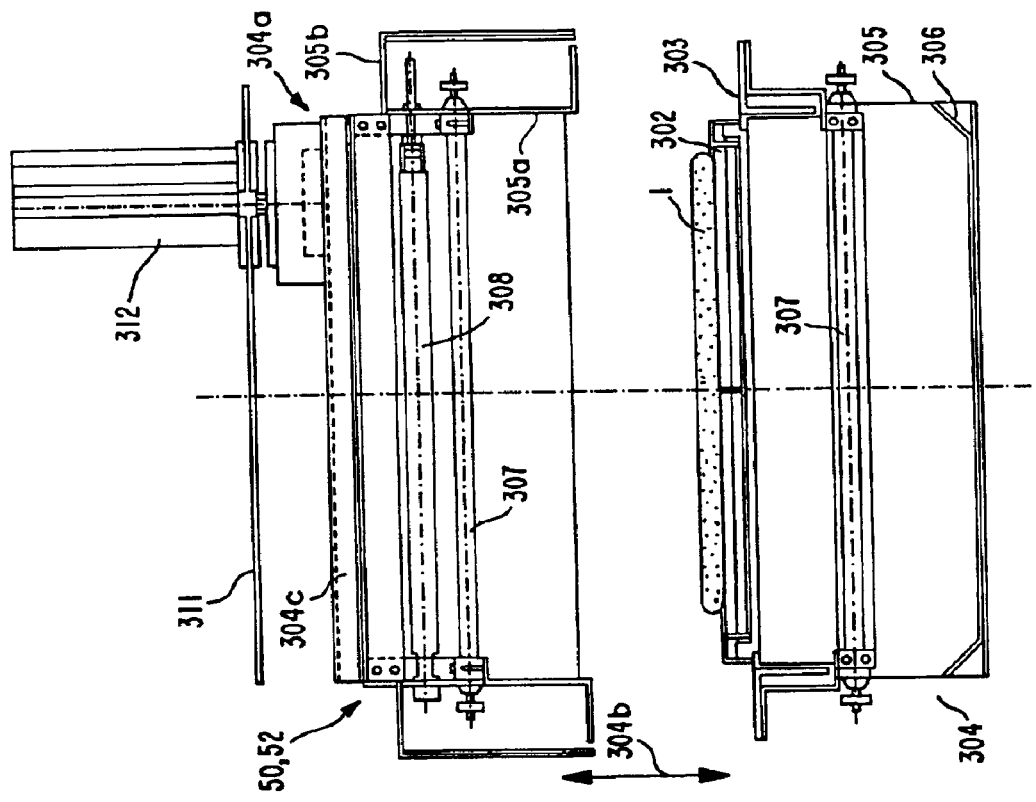
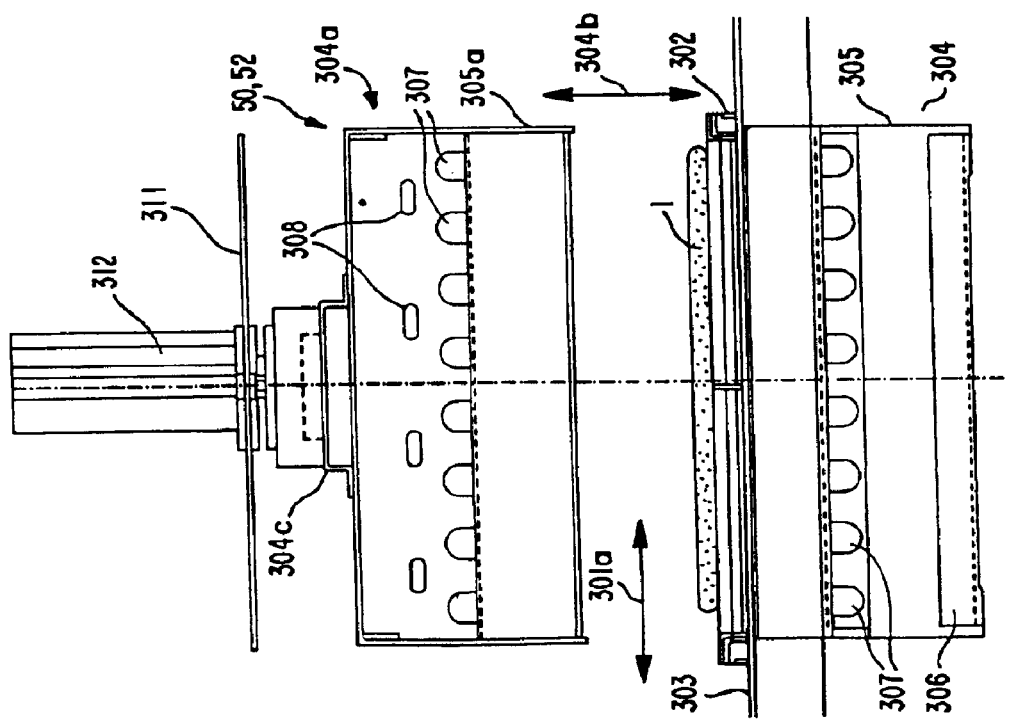

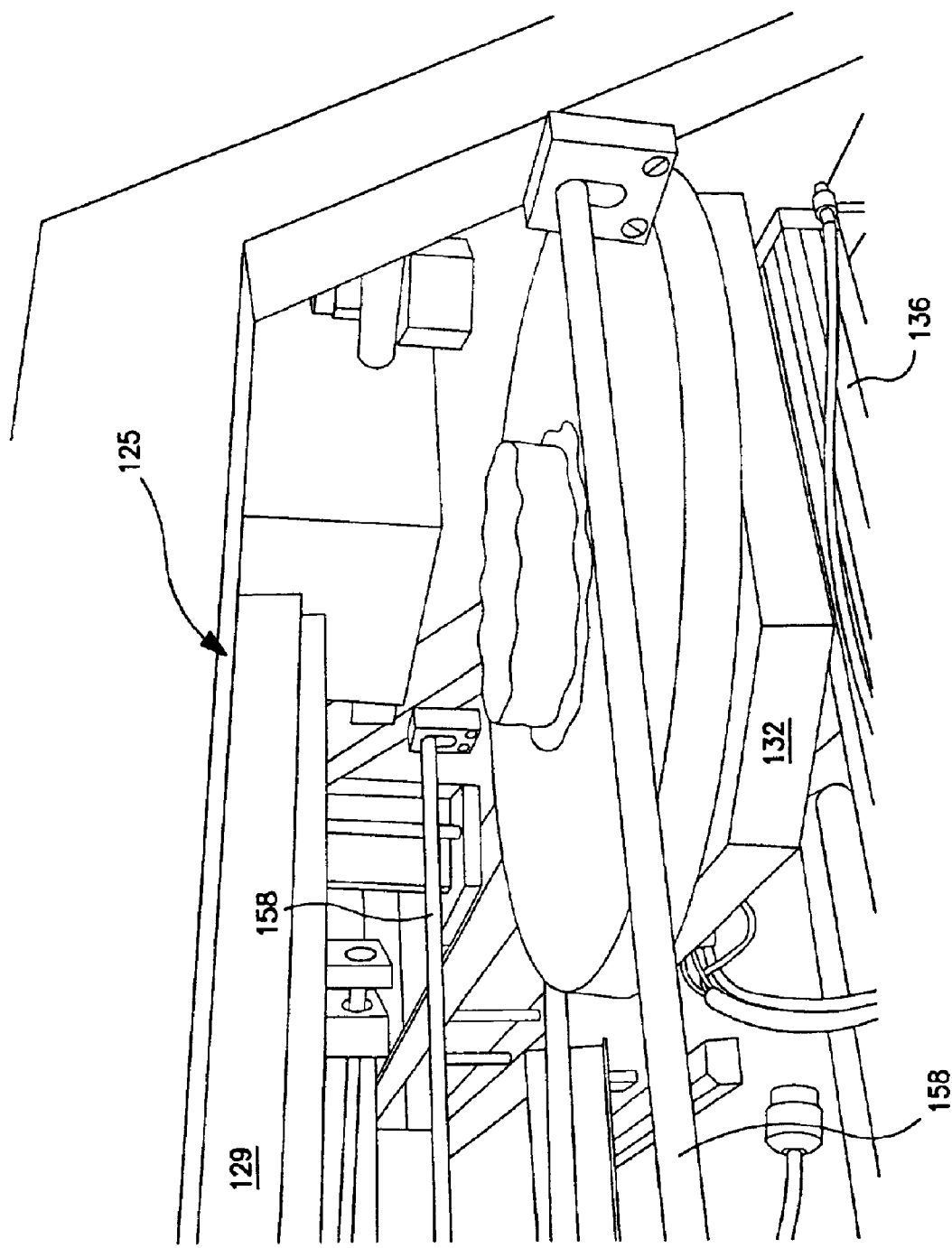

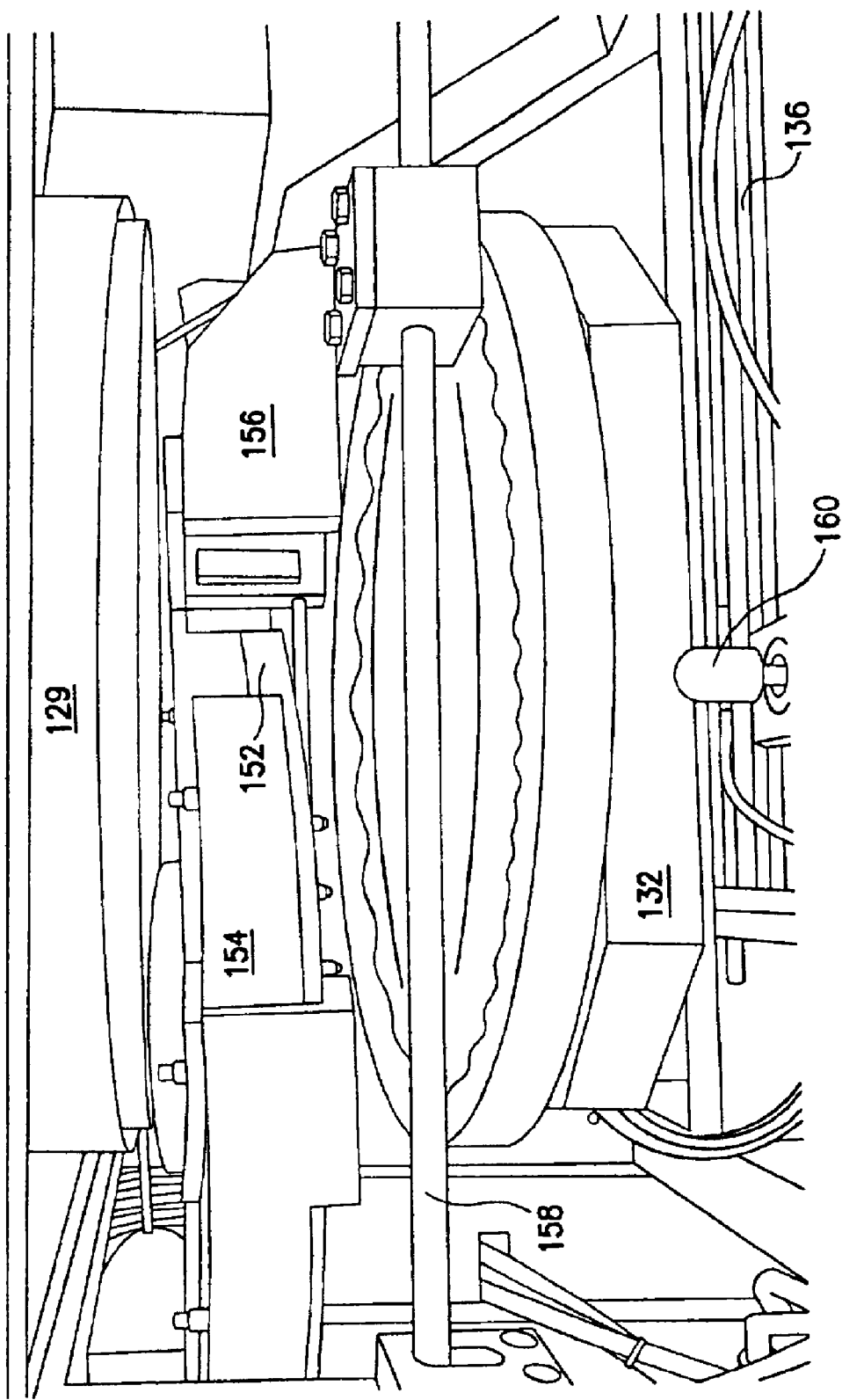

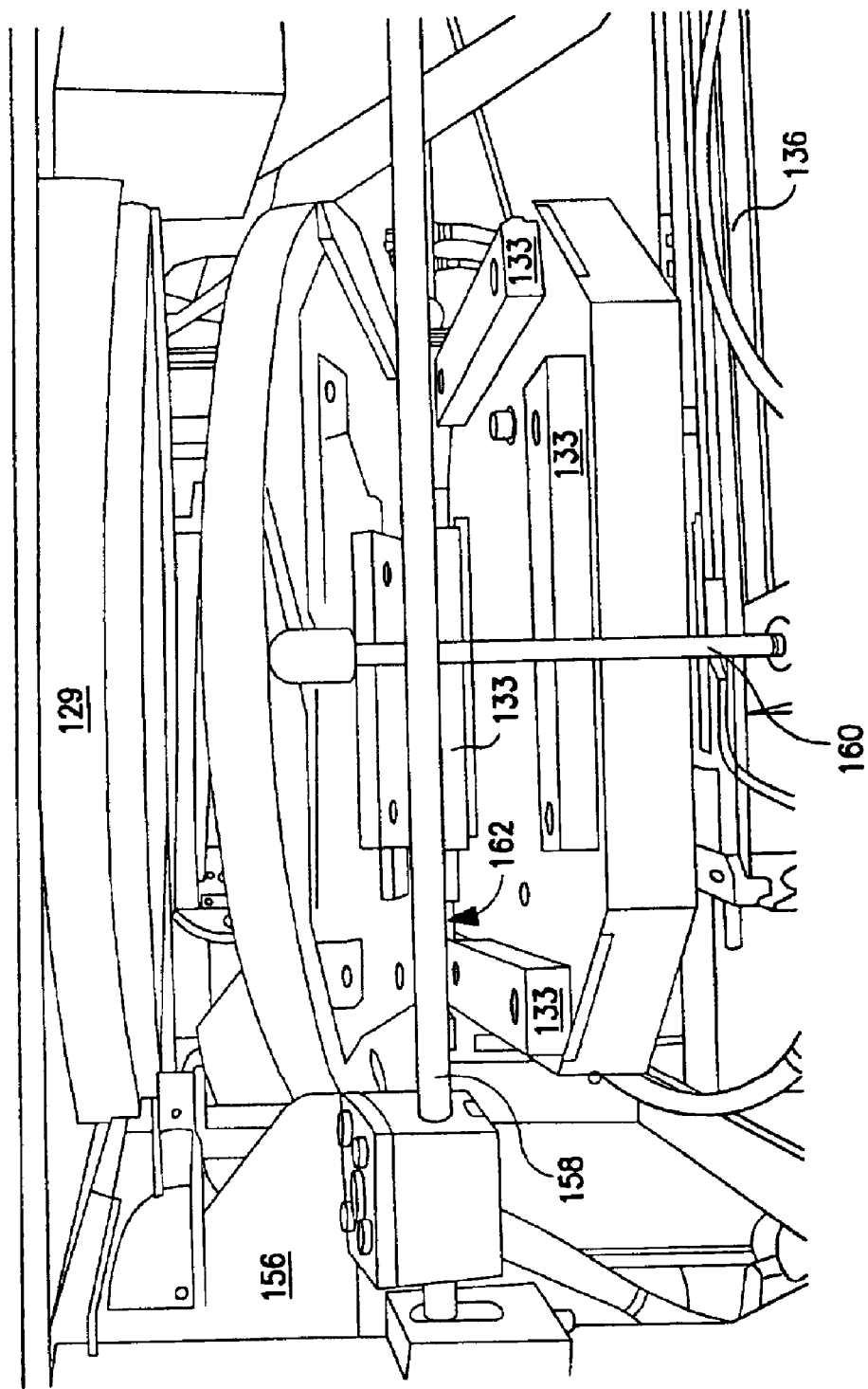

PIZZA MAKING METHOD AND SYSTEM

RELATED APPLICATIONS

The present application is a continuation-in-part of applicant's U.S. patent application Ser. No. 09/832,409, filed Apr. 11, 2001, entitled "Method and Device for Producing Pizza", (now U.S. Pat. No. 6,546,847), which application is a divisional application of U.S. patent application Ser. No. 09/294,702, filed Apr. 19, 1999 (now U.S. Pat. No. 6,245,370), which application is a continuation-in-part of Patent Cooperation Treaty Application No. PCT/EP98/05093, filed Aug. 12, 1998, which application claims priority to Italian Patent Application No. BZ97A000044, filed Aug. 19, 1997.

The present application is a continuation-in-part of Patent Cooperation Treaty Application No. PCT/EP01/04656, filed Apr. 25, 2001, entitled "Dough Mixer with Metering Device", which application claims priority to European Patent Application No. 00109611.4, filed May 5, 2000.

The present application claims priority under 35 USC § 119(a) to Italian Patent Application No. BZ2001A000033, filed Jun. 7, 2001, entitled "Pizza Cutting and Transfer Device".

The present application claims priority under 35 USC § 119(a) to European Patent Application No. 01113720.5, filed Jun. 5, 2001, entitled "Metering Device for Liquid or Cream-like Components for Garnishing Food Products".

The present application claims priority under 35 USC § 119(e) to U.S. Provisional Patent Application No. 60/297,160, filed Jun. 8, 2001, entitled "An Automatic Pizza Making Method and System". U.S. Provisional Patent Application No. 60/297,160 is incorporated in its entirety by this reference.

FIELD OF THE INVENTION

The present invention relates generally to pizza making, and more particularly to an automated method and system for making pizza from fresh ingredients according to individual orders.

BACKGROUND OF THE INVENTION

Methods and systems are known for the automatic industrial production-line and mass-produced production of pizzas. These methods and systems essentially include the following work phases: preparation of dough including rising of the dough, extruding the dough creating a dough strand, cutting the dough strand into individual dough portions, processing the dough portions to flattened pizza bases, adding seasonings and toppings, baking, packaging for consumption within the expiration date or, respectively, for deep freezing.

Systems employing the above-referenced methods are numerous for mass-production. Existing automated systems have accelerated pizza production by employing pre-treated dried granulate with seasonings and toppings applied to a pre-determined, large number of pizzas of the same variety on a continuous belt with baking in a tunnel oven. Some existing systems accelerate production by employing pre-produced, precooked and/or frozen dough portions and toppings.

For the foregoing reasons, there is a need for an automatic pizza making method and system that provides fast, individual and completely fresh pizza preparation according to individual order placement.

Dough Mixer

Dough mixers for producing dough used in preparing foods are known which use one or two screw conveyors, or rotating mixing arms within fixed or rotating containers with vertical or angled axis or kneading elements rotating within a closed housing with a horizontal axis. Also known are smaller mechanical devices for preparing dough in the household; generally these include a cylindrical container with a vertical axis within which one or more agitator blades operate on a single drive shaft attached coaxially to the container axis.

Information relevant to attempts to address dough mixers can be found in U.S. Pat. Nos. 5,486,049; 4,630,930; and 5,322,388. However, each of these references suffers from one or more disadvantages.

The known devices are not designed for preparing individual dough portions per work cycle within relatively short periods of time and by charging with ingredients in individual portions; further, known devices do not provide that each dough portion prepared and discharged for shaping leaves no ingredients or dough residue inside the device. The known devices are also not designed to perform a periodic, completely automatic sterilization of the kneading chamber and elements.

Also known in the art is the problem of charging kneading devices with relatively exact volumetric amounts of flour or flour-like ingredients which are hydroscopic. Such problems result from the tendency of flour-like materials to form accumulations or agglomerates inside the container, that varying the material volume above the metering mechanism strongly affects the metering process and that it is difficult to achieve an even filling and/or emptying of the metering chamber.

For the foregoing reasons, there is a need for a dough mixer of simple, compact design which can be automatically sterilized, has an essentially cylindrical chamber with kneading rotation occurring about a horizontal axis to accommodate direct charging of consistently accurate and pre-metered amounts of material per work cycle while preventing accumulation of material in the container and/or metering chamber, the dough mixer quickly preparing, on demand, one individual dough portion suitable for preparation of one pizza by subsequent shaping, garnishing and baking.

Tomato Sauce Dispenser

Systems are known for mechanical metering and garnishing of pizza with tomato sauce or other liquid components. Most of these devices supply the sauce by tube, under pressure generated by a pump. Generally these systems are mounted on a production line above a passage area of the dough base to be garnished, the garnishing process occurring by free fall. Accordingly, uniform distribution of the sauce to the dough base requires several tubes or nozzles and air jets evenly spaced above the garnishing area to evenly distribute the sauce on the dough base.

Known liquid dispensing systems have several disadvantages. Systems with a plurality of tubes and nozzles are unsuitable for liquids such as tomato sauce as tomato sauces are rarely homogenous in fluidity and texture. As such, the individual nozzles fed from one single supply tube rarely dispense equal quantities of the sauces. In addition, dispensing sauce from a plurality of tubes and nozzles creates cleaning and sanitation problems as the sauce often drips from the nozzles after product flow ceases. To prevent the product from spoiling, mold from forming and bacteria from breeding during downtimes, tubes must be exchanged often, resulting in increased production costs.

Known liquid dispensing systems using air jets require high product homogeneity, accurate product metering and precise jet calibration based upon texture and volume of the liquid to be distributed. Air jet systems often distribute excessive product, insufficient product or provide intermittent distribution while continually experiencing cleaning problems.

Other existing free falling systems require that the underlying dough base rotate about a vertical axis with sauce distributed in a spiral manner. These systems allot all movement to the dough base, whereas dispensing nozzles remain stationary. One disadvantage of these systems, if integrated into a production line for pizza, is the complication or exclusion to using traditional conveying systems to transport the dough base through the production line due to the requirement of rotating the dough base during sauce application. Thus, conveying systems must provide the additional capability of rotating the dough base over a portion of the production line. Or, the conveying system must transfer the dough base to a separate device to spin the dough base. Further complications arise when the production line requires that the dough base be heated during conveying and/or garnishing.

For the foregoing reasons, there is a need for a tomato sauce dispenser that provides even sauce distribution on a dough base (regardless of sauce homogeneity), that performs in a production line having traditional conveying systems and/or conveying systems applying heat to the dough base during transport thereof through the production line, and also facilitates easy cleaning and maintenance.

Oven

Electric ovens employing electrical resistance, microwave generators (magnetrons), infrared lamps or induction units as a heat source for cooking relatively thin cakes, such as pizza and focaccia, are known, as are ovens employing one or more such heat sources in combination, such as ray or wave sources. These ovens are designed to cook or heat fresh or frozen foods, which may be precooked, in a relatively short time.

Cooking time is important for industrial food-production processes and for automated machines that heat or cook food on the spot. Such machines commonly use cooking systems employing microwaves and/or infrared rays, sometimes in combination with electrical resistance. However, it takes approximately 80 seconds to cook and brown pizzas having a diameter of about 270 mm and total weight of about 320 g to 360 g.

For the foregoing reasons, there is a need for an oven that can fully cook and brown fresh (not precooked) food in a shorter time period, without sacrificing the organoleptic and nutritional properties associated with traditional cooking.

Automatic Cutting Device

A number of devices exist for automatically cutting pizza or focaccia into slices, using plates provided with blades which operate vertically like a dinking die on the pizza being cut. The existing devices only cut the pizza, requiring specific devices to then transfer the cut pizza to the take-out box or other packaging.

Furthermore, the known devices are not designed for easy cleaning and/or replacement of the parts that come into repeated contact with the pizza, thereby creating cleanliness and hygiene problems with both the cutting device and the transfer device.

For the foregoing reasons, there is a need for a simple, combination cutting and transfer device which is easy to clean and uses some of the cutting movements to transfer the pizza, thereby expediting the pizza making process.

SUMMARY OF THE INVENTION

The present invention is an automatic pizza making method and apparatus providing fast, individual and completely fresh pizza preparation according to individual order placement. The pizza making system is innovatively designed for production of fresh pizza by turn-key operation. The pizza making system comprises multiple processing stations that combine ingredients, namely, flour, water, salt, leveling agent, tomato sauce, cheese and assorted toppings such as sausage and pepperoni, to prepare and bake a pizza.

Accordingly, it is an object of the present invention to furnish an automated method and a system for pizza production according to individual orders placed by selections from a list, the production employing only fresh ingredients (no pre-cooked and/or deep-frozen ingredients for the dough or toppings) with each pizza individually seasoned, spiced, garnished and baked in a short time and provided ready to eat.

It is another object of the present invention to furnish the method and system such that the production process is performed hygienically, without human intervention and where periodic and automated washing and sterilization cycles are provided to maintain the system in a suitable hygienic state.

It is a further object of the present invention to simply and periodically exchange system components that contact foodstuffs and are not otherwise subjected to the germicidal effect of elevated temperature.

Dough Mixer

The dough mixer of the automatic pizza making method and system of the present invention satisfies the need described above for dough mixers. The dough mixer has a simple, compact design providing automatic sterilization. The dough mixer has an essentially cylindrical chamber with kneading rotation occurring about a horizontal axis to accommodate direct charging of consistently accurate and pre-metered amounts of material per work cycle while preventing accumulation of material in the container and/or metering chamber. The dough mixer quickly prepares, on demand, one individual dough portion suitable for preparation of one pizza by subsequent shaping, garnishing and baking.

Tomato Sauce Dispenser

The tomato sauce dispenser of the automatic pizza making method and system of the present invention satisfies the need described above for liquid dispensers. The tomato sauce dispenser provides even sauce distribution on the dough base (regardless of sauce homogeneity), performs in a production line having traditional conveying systems and/or conveying systems which apply heat to the dough base during transport thereof through the production line, and facilitates easy cleaning and maintenance.

Oven

The oven of the automatic pizza making method and system of the present invention satisfies the need described above for ovens. The ovens of the present invention use infrared rays emitted in two different wavelength ranges by separate and specific sources, each differing in design, to produce specific heat within the top surface (toppings) of the pizza and within the thin cake (dough). The infrared rays are programmably cycled on and off, with wavelengths in a visible and near-infrared range penetrating deep into the dough, propagating in accordance with the laws of optics (especially in the presence of water molecules), while wavelengths in a far-infrared range are absorbed in the top surface of the pizza, to fully cook and brown a typical pizza in approximately 55 seconds.

Automatic Cutting Device

The automatic cutting device of the present invention provides a simple, easy-to-clean cutting and transfer device that uses some of its cutting mavements to transfer the pizza. The present invention attaches a sheet that slides vertically by its own weight or by spring action to a side of a plate provided with blades. After cutting the pizza, the sheet holds the cut pizza in the cutting position as the plate that supports the pizza during cutting moves horizontally to drop the pizza onto a top box of a stack of take-out boxes disposed below. Alternatively, the sheet assists the transfer of the pizza onto a take-out box to one side as the entire cutting device moves laterally, lifting the plate provided with blades once the pizza is placed on the box.

The present invention also provides blades that are easily detached from the supporting plate for replacement and cleaning, regardless of whether the blades are single-use or coated with a sheath or layer that can be removed easily at the end of a predetermined cutting cycle, thereby making the cutting device as hygienic as possible.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 10b illustrates a front section of the tomato sauce dispenser according to the plane II—II in FIG. 10a;

FIGS. 12a through 12d illustrate a front partial sectional, a left side partial sectional, a top plan and a left side sectional detailing internal mechanisms, respectfully, of a pepperoni dispenser of the automatic pizza making system shown in FIG. 1;

FIGS. 15a through 15f are left side elevations of the automatic pizza making system shown in FIG. 1 (close-up views of FIGS. 3a and 3b) illustrating, step by step, a dough shaping and dough punching process according to the present invention.

DETAILED DESCRIPTION OF THE INVENTION

Figure 1:
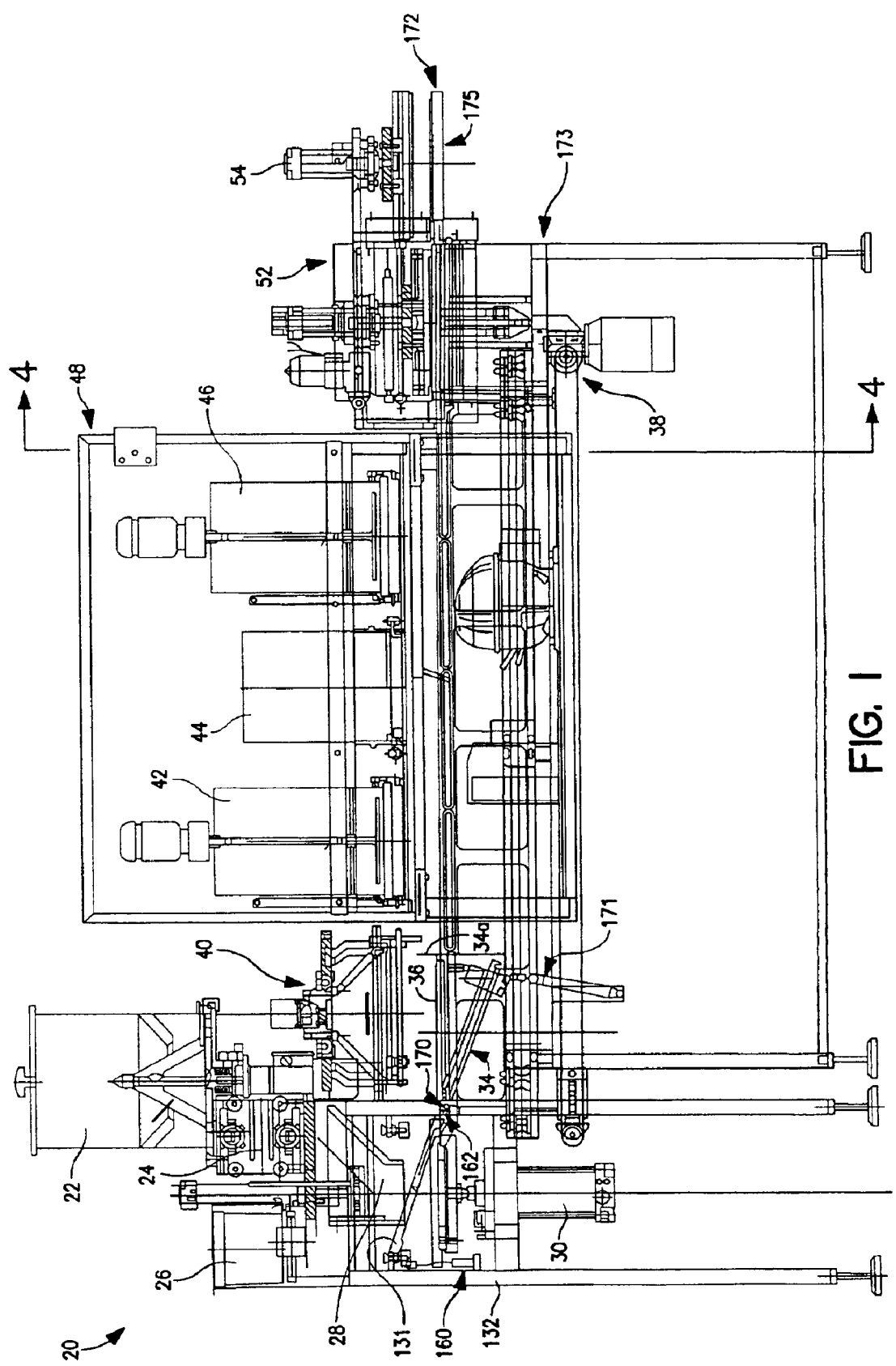
FIG. 1 illustrates a front elevation of the automatic pizza making system according to the present invention.

Referring now to the drawings, wherein like numerals indicate like elements, there is shown in FIGS. 1 through 4 an illustration of an automatic pizza making system 20. The pizza making system includes a flour container 22, a dough mixer 24, a water and leveling agent container 26, a pre-former 28, a hot press 30, a dough punching device 32, a receiving rack 34, a conveying tray 36, a tray conveying system 38, a tomato sauce dispenser 40, a cheese dispenser 42, a pepperoni dispenser 44, a sausage dispenser 46, a refrigerator 48, a first oven 50, a second oven 52 and a cutting device 54.

Figure 5:
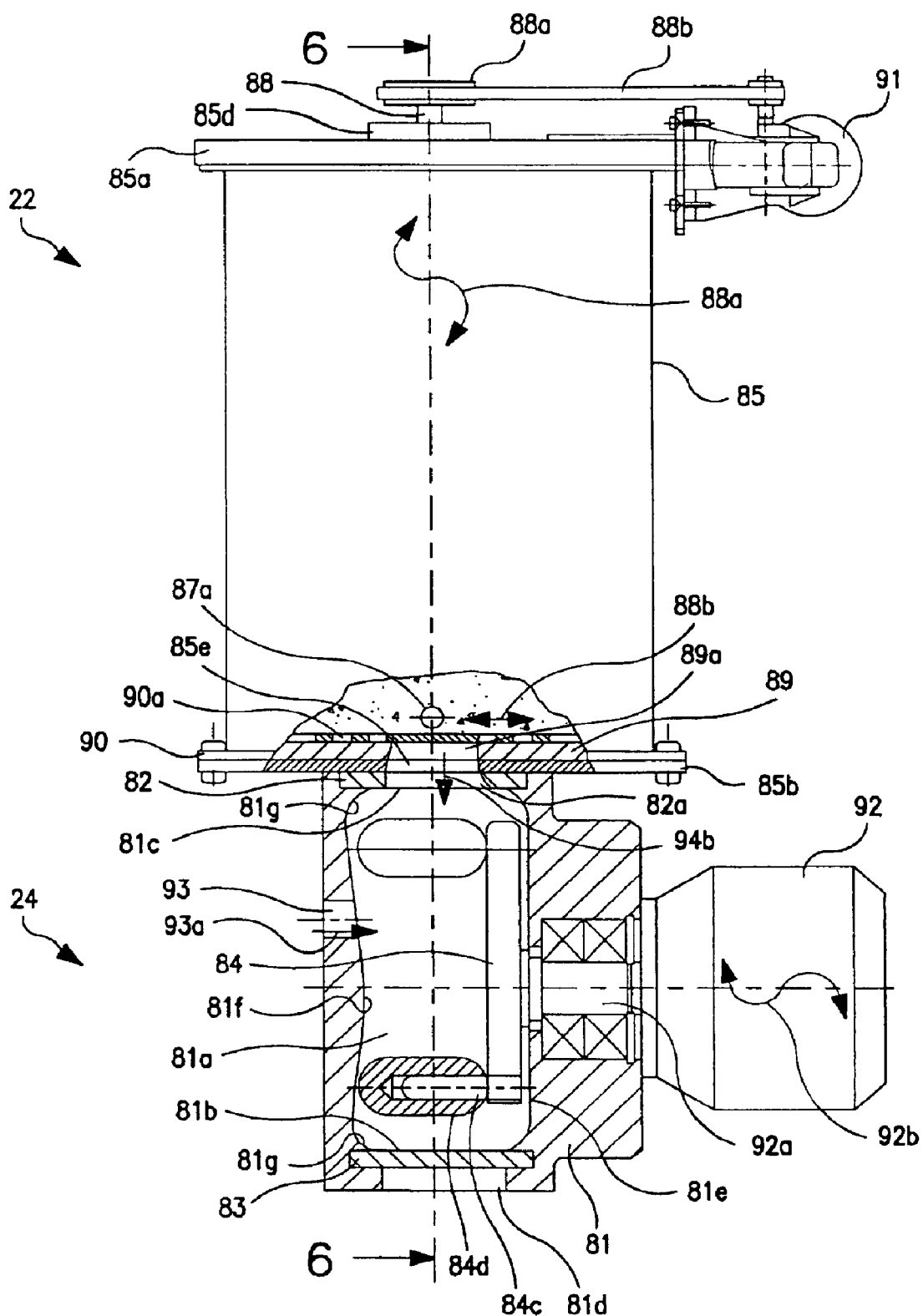
FIG. 5 illustrates a right side, partial sectional elevation of a flour container and dough mixer of the automatic pizza making system shown in FIG. 1.
Figure 6:
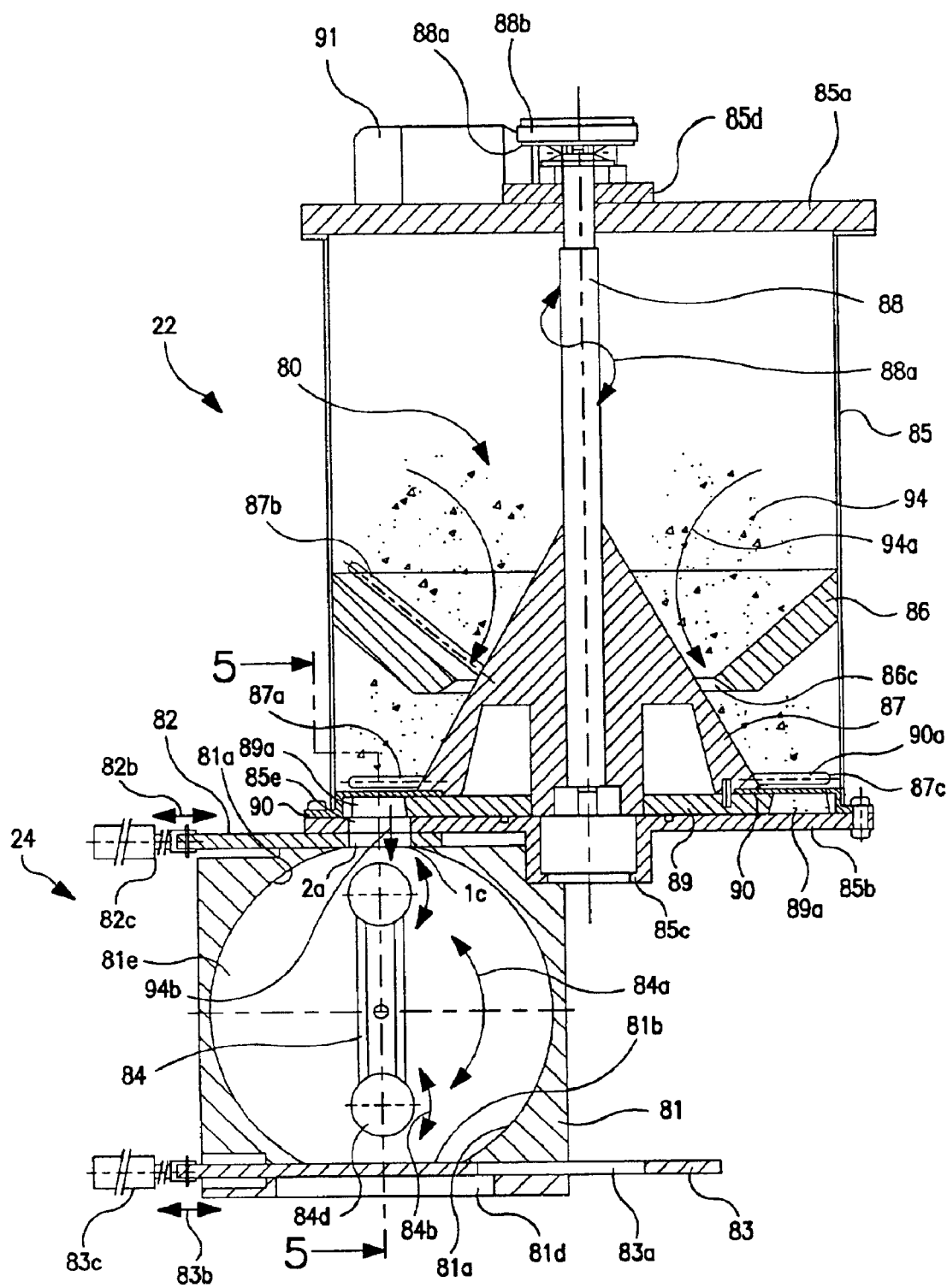
FIG. 6 illustrates a front sectional elevation of the flour container and the dough mixer shown in FIG. 5.

Flour Container and Dough Mixer (FIGS. 5 & 6)

The dough mixer of the present invention is designed for preparing individual dough portions per each work cycle within relatively short periods of time and by charging with ingredients in individual portions. The dough mixer provides that every individual mixed dough portion that is rolled into a ball and is ready for shaping and baking can be discharged without leaving ingredients or dough residue inside the device. The dough mixer also performs a periodic, completely automatic sterilization of the kneading chamber and its kneading elements.

The object of the flour container and dough mixer of the present invention is to create a dough mixer that has a simple and compact design, can be automatically sterilized, has an essentially cylindrical chamber with horizontal axis in which a kneading element operates with horizontally rotating axis, due to direct charging of the chamber with pre-metered ingredients per work cycle, to create in a short period of time a portion of dough which then is finally discharged as a mixed individual portion in the form of a ball and ready-made for subsequent shaping, garnishing, and baking or deep-freezing.

To attain the flour container and dough mixer described above, a housing is designed having an inner chamber that is essentially cylindrical and has in its upper section, which corresponds to the charging region for the flour-like and possibly also liquid ingredients, as well as in the lower section, which corresponds to the discharge region, a surface area that runs parallel to the chamber axis and turns into the chamber casing surface. Within this chamber operates a rotating kneading element according to an axis that runs coaxially or parallel to the chamber axis. The rotating kneading element comprises at least one arm formed with one end attached radially to the end of a drive shaft, and on the other end of which at least one fixed bearing pin is attached cantilever with an axis running parallel to the rotational axis of the drive shaft; a freely turning sleeve is placed by means of a recessed hole on top of this bearing pin with rounded terminal ends on both sides. As an advantageous feature are two arms extending radially from the same drive shaft, which are oriented to each other longitudinally or are in the same level but are at a certain angle to each other, and each of these arms carries a bearing pin with a rotating sleeve placed on top parallel to the rotational axis, preferably with a different distance to the rotational axis of the drive shaft. While these bearing pins, which are equipped with rotating sleeves, are in motion, the dough is compressed, rolled and rolled thin repeatedly in particular in the lower region of the chamber with the level surface section that turns into the curved casing surface. If a plurality of these sleeves are operated, they can have varying outside diameters, cross-sections, and shapes depending on the consistency of the dough being produced and/or the properties of the ingredients and/or the percentage of liquid ingredients. The invention provides further for the interchangeability and/or the change in the number of the sleeves mentioned, depending on the properties of the ingredients and/or the dough that is being prepared.

Due to the charging of the chamber with dry flour-like ingredients, the kneading element carries out the work phase with the purpose of homogenizing and aerating the dried ingredients by rotating at a relatively high speed in order to achieve a thorough mixing of the ingredients introduced, and their preparation for the subsequent introduction of liquid ingredients, which ensures that they are evenly absorbed, and the dough agglomerate is then created with a markedly reduced rotational speed; by further reducing the speed, a mixing and homogenization of the dough mass is achieved, which then, upon further reduction in rotation speed, is compressed and rolled into balls, which as such are discharged in part due to gravity by opening the discharge opening in the region corresponding to the lower level surface section of the chamber.

The individual inner surfaces and surface areas of the dough mixer chamber have surface transitions with rounded areas with the largest possible radius, including the rotating arms or the sleeves of the kneading elements, all have rounded forms, and thus the chamber space is free of edges or recesses on which dough residue could stick that is not discharged along with the individual portion, due to the process by which the dough is kneaded and rolled into balls. After rolling into balls and discharging, the chamber and the kneading elements are thus free of any residue from the dough and ingredients. This form further allows them to be sterilized by means of hot air, through which small amounts of sticky dough residue are removed in the air current due to the drying process and the application of pressure.

The front surface of the chamber, which is across from the second front surface from which the drive shaft for the kneading element projects, can have a level, conical, more or less rounded form that protrudes against the drive shaft, with its axis extending coaxially to the rotational axis of the drive shaft or parallel to it preferably in the upper level of the chamber. By means of a distinctive conical or nose cone form, the rotating sleeves of the kneading element can roll the dough thin even with this shape. Further, the housing wall corresponding to this front interior surface with more or less distinctive shape can be replaced by another housing wall, in order to change the volume of the chamber by changing the distance between the front circular surfaces; in this case, the sleeves on the kneading element are also replaced by sleeves with the appropriate longitudinal extension.

Preferably, the liquid ingredient(s) for preparing the dough are introduced through one or more openings in the central region at the front wall across from the wall with the drive shaft.

In terms of the volumetric metering of the dry, flour-like ingredients, the invention proposes that a metering device be located in the region of the charging opening that is equipped e.g., with sliding blades, which essentially comprises a cylindrical container with vertical axis for the flour, and this container is equipped with a volumetric metering mechanism at its bottom. The container has inside in its lower region an annular, funnel-like partition, and the point of a distribution cone extends through the partition's central, circular opening so that an annular passageway is free for the flour. The container has at the bottom a metering sieve above which beaters move during the rotation of the distribution cone, which is driven by means of a vertical central shaft by a motor, in order to transport the flour through the metering sieve and through the holes which are positioned equidistant to the rotational axis on the metering disk located beneath it. The metering disk is located on the bottom disk, which is connected to the cylindrical wall of the container and which has a hole in the region of the charging opening of the dough mixer attached beneath it, through which the flour falls from the metering holes at the rotating metering disk and through the charging opening into the chamber of the dough mixer.

The present invention does not exclude the possibility that the dough mixer is fed from a metering device that has features other than those proposed by the invention, or from a device which charges with a pre-measured portion.

One embodiment of the flour container and dough mixer described above is illustrated in FIGS. 5 and 6. This embodiment is capable of preparing individual portions of 130–260 g within 10–15 seconds, which is suitable for the automatic pizza making system of the present invention.

FIG. 5 illustrates a section of a dough mixer 24 according to the invention during the charging phase and linked to a metering device 80, showing a sectional view according to the plane of section I:I in FIG. 6, which plane runs through the axis of the drive shaft of the metering device 80.

FIG. 6 shows the dough mixer 24 according to the invention and as shown in FIG. 5 together with a metering device 80 in section according to the plane of section II—II in FIG. 5.

The dough mixer 24 for preparing individual portions comprises a housing 81 with an inner chamber and a kneading element 84, 84c, 84d, containing a charging opening 82a and a discharging opening 83a, 81d, with corresponding blades 82, 83. The essentially cylindrical chamber with horizontal axis is delimited by a level, circular surface 81e from which a shaft 92a extends coaxially, by a circular surface 81f corresponding to the aforementioned but with a conical form projecting slightly into the chamber, by two curved surfaces 81a with a casing line equidistant from the chamber axis, by an upper level surface section 81c that essentially corresponds to the region of the charging opening 82a, and by a lower level surface section 81b, which is larger than the upper one and corresponds to the region of the discharging opening 81d, 83a.

The kneading element comprises an arm 84 which is fastened on its front side at the end of the drive shaft 92a that extends into the chamber; at each of the ends of arm 84 a pin 84c is fastened having an axis running parallel to the rotational axis of the drive shaft 92a, and a freely turning 84b sleeve 84d with a rounded, hemispherical or nose cone-shaped terminal area is placed on each of pins 84c by means of a recessed hole. Arm 84 of the kneading element is fastened to drive shaft 92a, off-center relative to the center line of the transverse-extending arm, such that two pins 84c with sleeves 84d attached to it turn with varying radius about the rotational axis of drive shaft 92a, which is driven by the electric motor 92 at varying rotational speeds and changing rotation directions.

Charging opening 82a for the introduction 94b of the flour-like ingredients in the upper region and discharging opening 83a, 81d for the individual portions of dough balls in the lower region, are provided with sliding blades 82, 83, which for example are moved 82b, 83b by pneumatic cylinders 82c, 83c without excluding the use of rotating blades and other drives.

Liquid ingredients are charged via a single hole 93 or via specific holes for each of the liquid ingredients, which holes are conical and all preferably disposed on the disc-shaped wall 91 in the region within the track of sleeve 84d, which turns with smaller radius about shaft 84a. Same hole 93 can be used for blowing in hot air to clean and/or sterilize the chamber and rotating kneading elements 84, 84c, 84d. The method for preparing dough with the dough mixer 24 according to this invention, has essentially the following phases:

Charging 94b with flour- or dust-like ingredients,
Homogenization and aeration of the flour- and/or dust-like ingredients,
Charging 93a with liquid ingredients,
Preparing the dough,
Rolling the dough thin,
Compacting and rolling the dough into balls
Discharging the individual dough portions Following production of a pre-programmed number of dough portions and based on the production intervals, the chamber of the dough mixer 24 is cleaned and sterilized with hot air.

Charging 94b with flour-like and/or dust-like ingredients is by free fall through charging opening 82a equipped with sliding blades 82, which is driven 82b by pneumatic cylinder 82c. The construction and operation of the metering device 80, in accordance with the invention, with discharging opening 85e, corresponding to charging opening 82a of the dough mixer 24 with which it is connected, will be explained later.

The flour-like and dust-like ingredients are homogenized and aerated by rotating kneading element 84, 84c, 84d at a relatively high speed (approx. 2,500–3,000 rpm) that creates a favorable dispersion of the ingredients due to the special form of the chamber and kneading elements, wherein the particles of the dry ingredients are prepared for even absorption of the liquid ingredients following charging 93a.

The dough mixture is prepared by rotating 84a kneading element 84, 84c, 84d at a lower rotation speed (approx. 950–1,400 rpm); this phase is followed initially by the formation of little dough clumps, which are then rolled together by the repeated action of rotating 84b sleeves 84d.

The dough is then prepared by rotating kneading element 84, 84c, 84d at an even lower rotation speed (approx. 850–920 rpm); especially in this phase, the dough is repeatedly and intensely rolled out and rolled thin by the turning 84b sleeves 84d, particularly at lower level surface section 81b. The formation of a compact, balled together dough mass follows at an even lower rotation speed (approx. 700–820 rpm), thus taking on the form of a "dough ball" at the end of this phase.

The "dough ball" is discharged by centrifugal force via the rotating kneading element and by gravity through discharging opening 83a, which is opened by activating 83b blade 83 by means of pneumatic cylinder 83c.

During the various work stages, in particular during compacting, rolling out, and balling together the dough, it can be advantageous to make one or more changes in rotational direction 84a of kneading element 84, 84c, 84d. Liquid ingredients can be charged 93a more or less in stages and while kneading element 84, 84c, 84d is rotating. For cleaning and/or sterilization of the chamber by injecting hot air, the cool air of motor 92 that drives 92a the kneading element or the air that is diverted from the pneumatic system can be used, the air being heated prior to its injection into the chamber.

The volumetric metering device 80 for the dry flour-like ingredients according to the invention comprises a cylindrical container 85, 85a, 85b with vertical axis, a distribution cone 87 with beaters 87a, 87b rotating 88a coaxially to the container axis, and a metering disk 89 with metering holes 89a on the rim which form the volume units for creating a total portion of flour 94 to be charged 94b into the dough mixer 24 in order to generate a single portion of dough.

Cylindrical vertical wall 85 is sealed with bottom plate 85b, which provides a seating 85c for the bottom end of a vertically rotating 88a shaft 88 that is centrally seated 85d in cover plate 85a. The upper end of shaft 88, which extends beyond the cover plate 85a, is equipped with a pulley 88a driven by the belt 88b of a motor 91 attached to the container. Shaft 88 can naturally be driven in other ways and by other sources of power. Inside, in the lower region, the container is equipped with an annular, funnel-like partition 86 for directing flour 94 in the direction of the container axis. The upper region of a distribution cone 87, which is connected to drive shaft 88, extends through the central opening in partition 86 such that an annular duct 86c results for flour; beaters 87b that extend down from the cone 86 and move closely above partition 86 cause flour 94 to pass through 94a. Partition 86 and cone 87 prevent variations in the fill level of flour 94 and thus the weight above partition 86 from having an affect on the metering mechanism disposed beneath. This mechanism comprises metering disk 89 with holes 89a on rim that rotates together distribution cone 87 and drive shaft 88; individual holes 89a, which are equidistant to the axis of rotation of the disk, represent with their volume the metering unit for creating the charging amount. Above metering disk 89 is a sieve 90 equipped with ducts 90a through which the flour is moved through at least one beater 87c which sticks out from cone 87, and turns with drive shaft 89, and moves above sieve 90. On the underside, metering disk 89 lies on top of bottom disk 85b of the container. Bottom disk 85b has an outflow through hole 85e that corresponds in diameter to holes 89a on metering disk 89 or is of a greater diameter and in the region of the passage of these holes. Practice has shown that the construction described here allows volumetric metering that is independent of the fill level in the container, the moisture level and other physical properties of the contents, which metering is sufficiently constant and can be varied by one or more volume units that are determined by individual holes 89a on metering disk 89. This feature of the metering device 80 is fundamental for achieving homogeneity in the individual dough portions, which requires charging with calibrated, homogeneous ingredients and attains this above all by assuring that the mixture does not put weight on the metering mechanism in a single casing 85, 85a, 85 which is fed via a relatively narrow annular duct 86c and, affected by simultaneous mixing motions in the container region above the partition 86 and in the emptying region of the metering holes 89a and at the metering disk 89. Naturally, the amount of flour 94, which moves through annular duct 86c, must be at least as great, preferably somewhat greater than the amount which is fed to the dough mixer 24 for the purpose of maintaining the individual portion of dough.

The present invention does not exclude the possibility of linking the metering device 80 according to the invention to a dough mixer or another device that does not correspond to the dough mixer according to the invention.

Figure 7A:
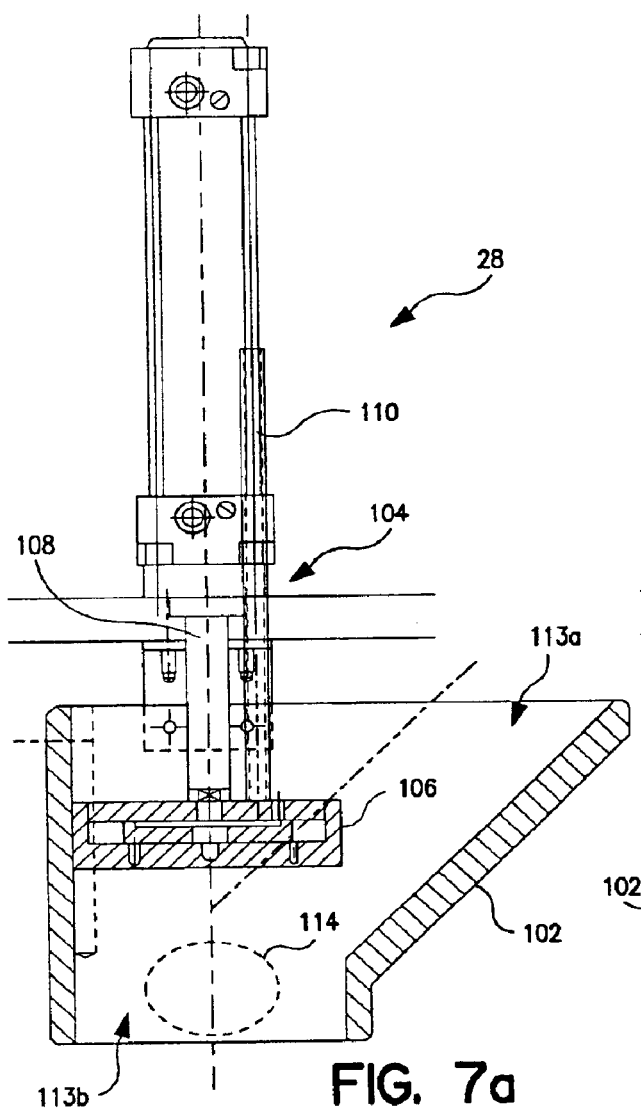
FIGS. 7a through 7c illustrate a front sectional, a left side sectional and a top plan, respectfully, of a pre-former of the automatic pizza making system shown in FIG. 1.
Figure 7B:
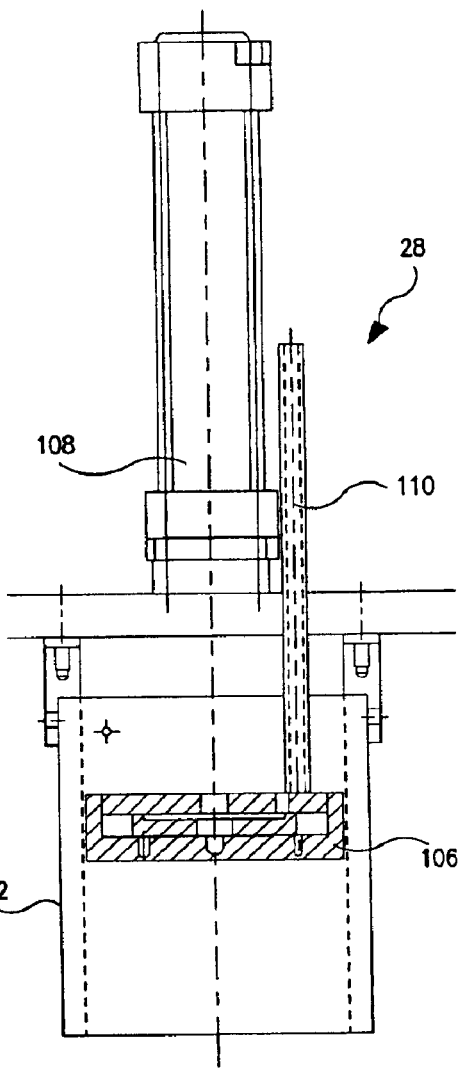
Figure 7C:
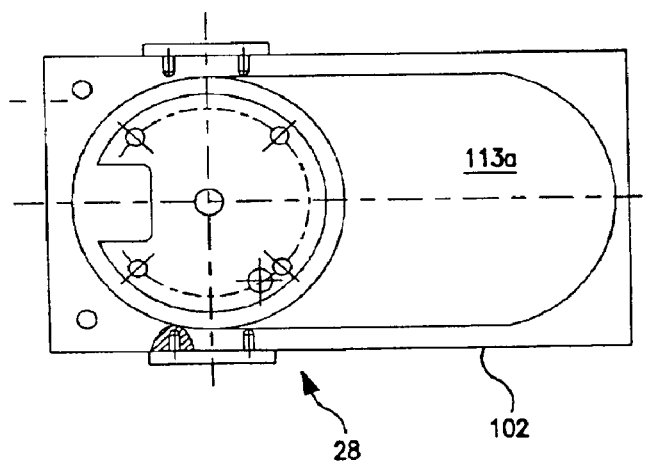

Pre-former (FIGS. 7a through 7c)

FIGS. 7a through 7c illustrate various views of a pre-former 28. The pre-former 28 receives the "dough ball" discharged by centrifugal force via the rotating kneading element and by gravity through the discharging opening 83a of the dough mixer 24, which is opened by activating blade 83b by pneumatic cylinder 83b.

The pre-former 28 is the first step of a process of shaping the "dough ball" into a flat cake for pizza preparation.

Referring to FIGS. 7a through 7c, the pre-former 28 includes a funnel housing 102 and a disc press 104, which includes a disk plate 106, a pneumatic cylinder 108 and a guide bar 110.

Opening 113a at the top of funnel housing 102 is positioned below discharge opening 83a, 81b of the dough mixer 24. The funnel housing 102 is fixedly connected to the underside of the housing 81 of the dough mixer 24.

The "dough ball" enters opening 113a, falls by gravity and comes to rest within the funnel housing 102 in the vicinity of a discharge opening 113b of the funnel housing 102, as shown in FIG. 7a by simulated "dough ball" 114. The dough ball 114 is prevented from exiting the discharge opening 113b by a lower press plate 131 of the hot press 30 which has been movably positioned in two dimensions against the bottom of the funnel housing 102 at the discharge opening 113b. The positioning of the lower press plate 131 against the bottom of the funnel housing 102, covering the discharge opening 113b, is timed to coincide with the activation 83b of the blade 83 which opens discharge opening 81d, 83a of the dough mixer 24, which discharges the dough ball into the pre-former 28.

The disk plate 106 is shaped as an inverted cup so that activation of the pneumatic cylinder 108, lowering the disk plate 106 until contact with the lower press plate 131 shapes the dough ball 114 into a disc or puck. The disk plate 106 and the lower press plate 131 can be preheated to warm the dough ball 113 during shaping to expedite dough baking later in the pizza making process.

Figure 8A:
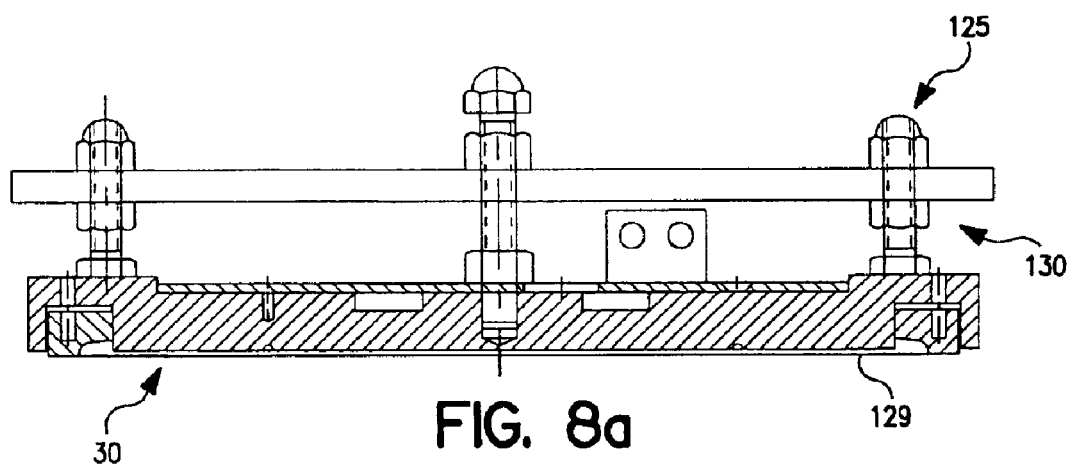
FIGS. 8a and 8b illustrate a left side, partial sectional elevation of a hot press of the automatic pizza making system shown in FIG. 1, FIG. 8a showing an upper press portion and FIG. 8b showing a lower press portion of the hot press.
Figure 8B:
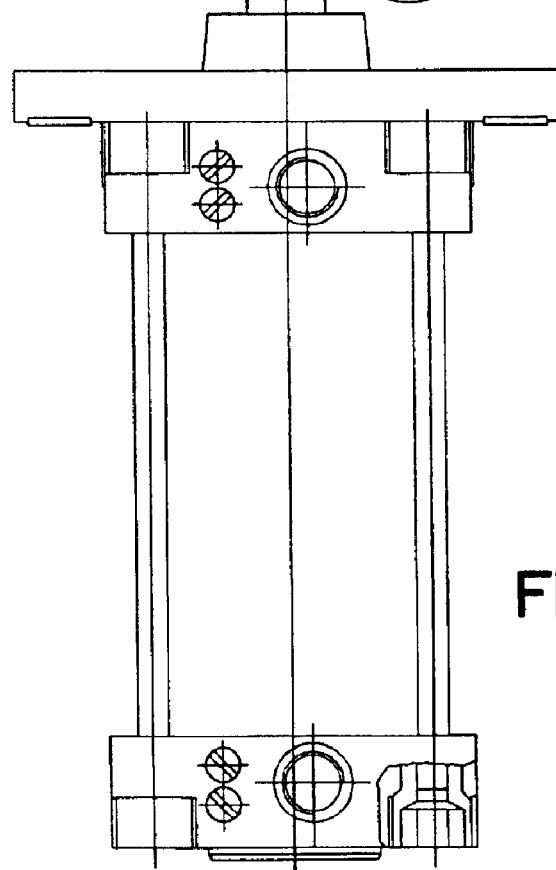

Hot Press (FIGS. 8a and 8b)

FIGS. 8a and 8b illustrate an upper press portion 125 and a lower press portion 127 of the hot press 30. The upper press portion 125 includes an upper press plate 129 which is fixedly connected 130 to structure of the pizza making system 20. The lower press portion 127 includes a lower press plate 131, a support plate 132, a buffer plate 133 and a pneumatic cylinder 134. The lower press plate 131 is fixedly connected to the support plate 132 and separated therefrom by the one or more buffer plates 133. As the lower press plate 131 is electrically heated to precook the dough during shaping, the one or more buffer plates 133 prevent the transfer of heat from the lower press plate 131 to the support plate 132 and the pneumatic cylinder 134.

Referring to FIG. 3, the lower press portion 127 of the hot press 30 is slidable in one dimension due to connection to lateral track 136 and lateral conveyance system 138. The lateral conveyance system 138 is pneumatically operated and programmed to slidably move the lower press portion 127 under the pre-former 28 with the pneumatic cylinder 134 raising the lower press plate 131 into contact with the underside of the funnel housing 102 to receive the dough ball discharged from the dough mixer 24. After the pre-former 28 shapes the dough ball into a disk, the lower press plate 131 is lowered by pneumatic cylinder 134 and the lateral conveyance system 138 slides the lower press portion 127 to the position shown in FIG. 3. The pneumatic cylinder 134 than raises the lower press plate 131 against the upper press plate 129 to shape the dough into flat cake for pizza preparation.

Again, the upper press plate 129 and the lower press plate 131 are electrically heated to precook the dough during the shaping process.

Figure 9A:
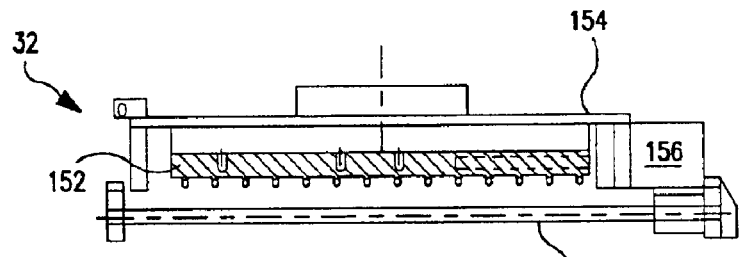
FIGS. 9a and 9b illustrate a left side, partial sectional and a top plan, respectfully, of the dough punching device of the automatic pizza making system shown in FIG. 1 (and detailed in FIGS. 3a and 3b), FIG. 9a showing the dough punching device in a retracted, operating position and FIG. 9b showing the dough punching device in an extended, non-operating position.
Figure 9B:
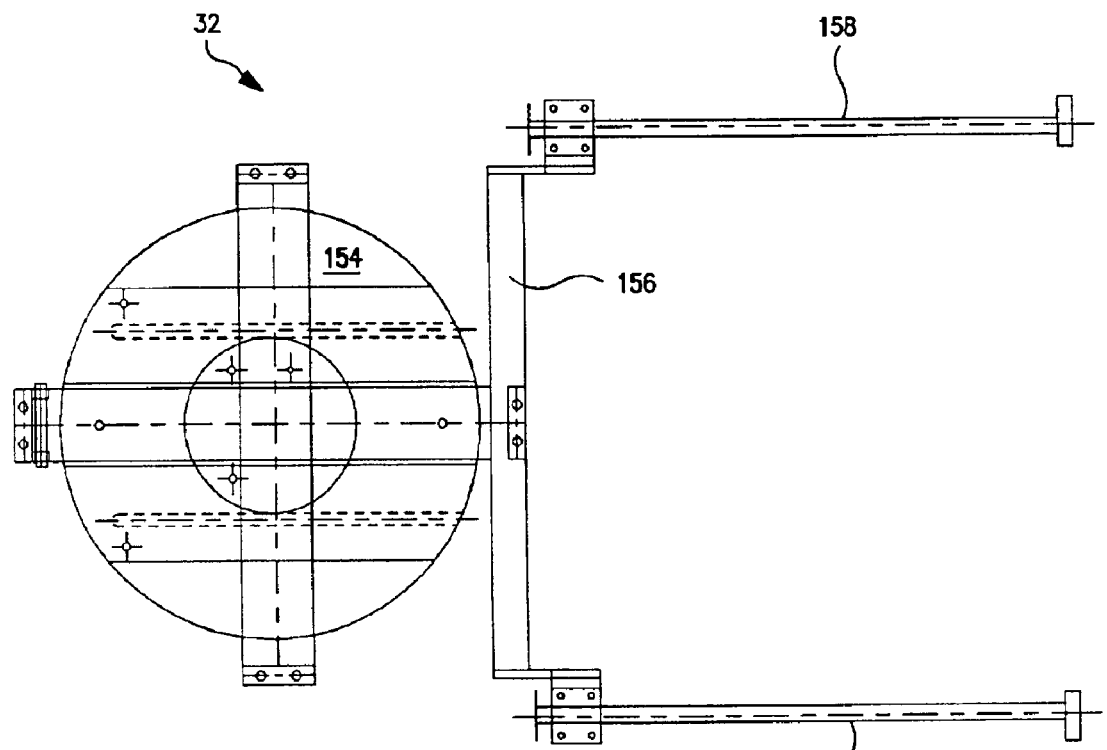

Dough Punching Device (FIGS. 9a and 9b)

FIGS. 9a and 9b illustrate a side elevation and top plan, respectfully, of the dough punching device 32. The dough punching device 32 includes a toothed punching plate 152, a slidable housing 154, a slidable support bracket 156 and two guide bars 158.

Figure 3A:
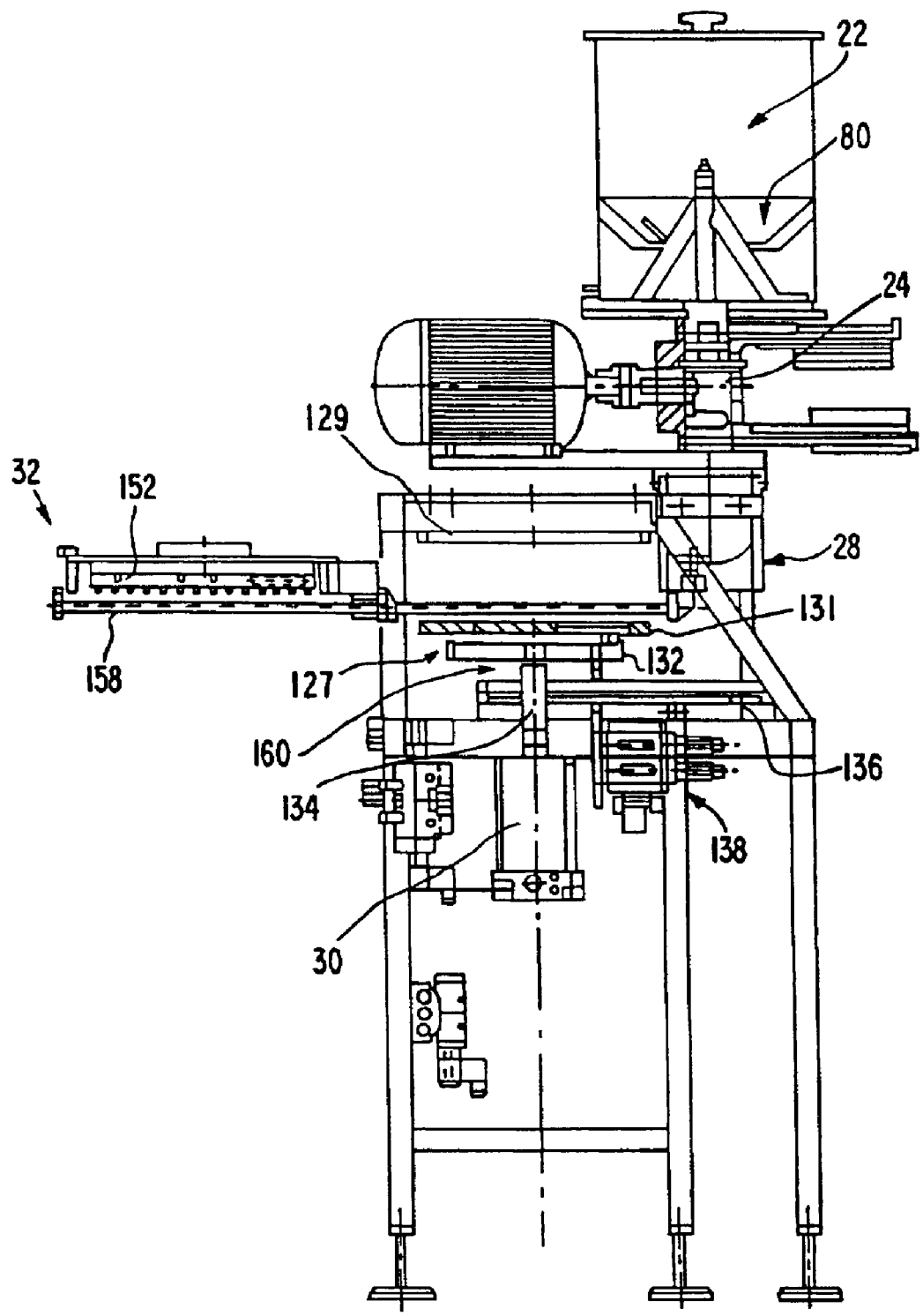
FIGS. 3a and 3b illustrate a left side elevation of the automatic pizza making system shown in FIG. 1, FIG. 3a showing a dough punching device in an extended, non-operating position and FIG. 3b showing the dough punching device in a retracted, operating position.
Figure 3B:
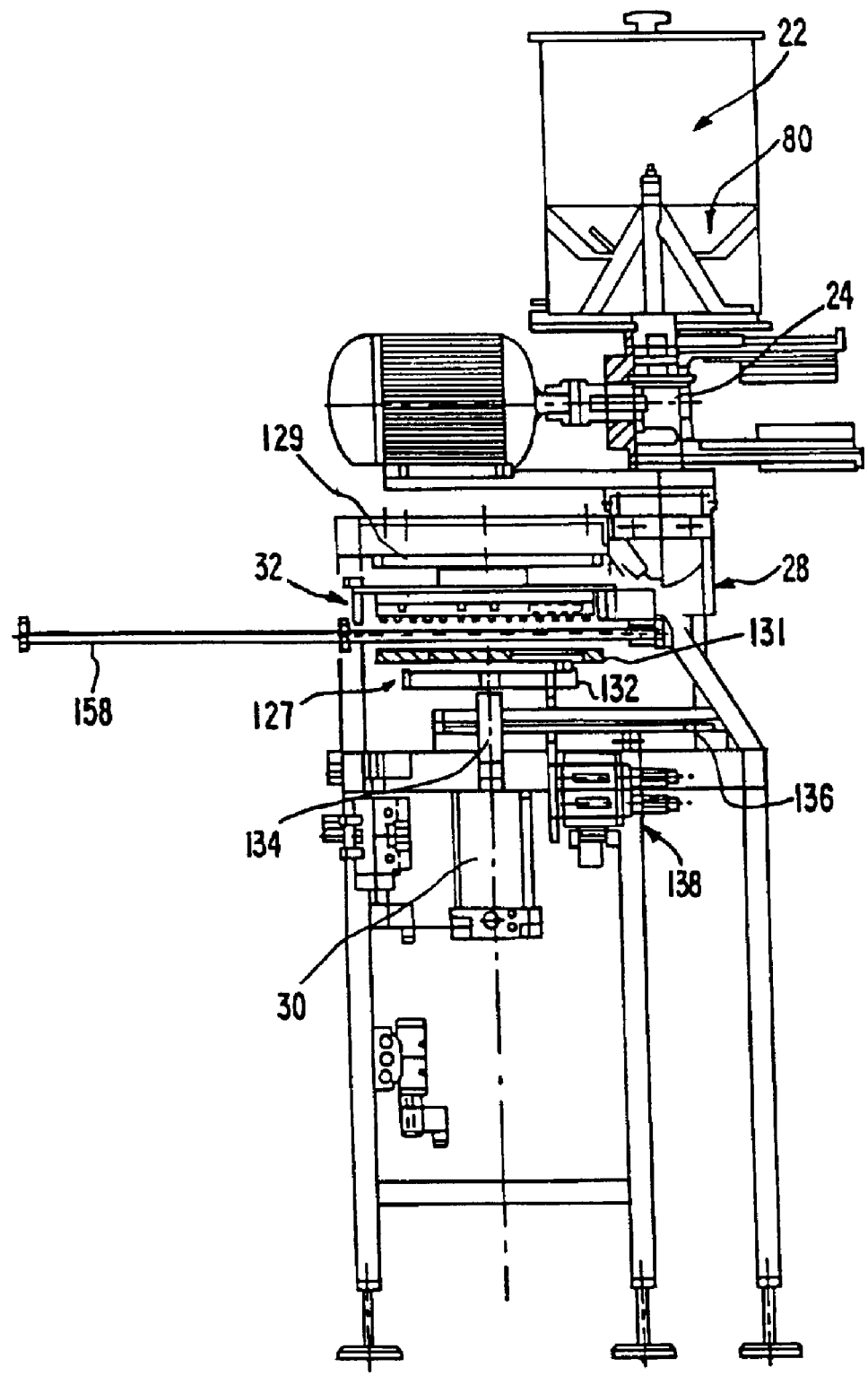

Referring to FIG. 3a, the dough punching device is shown in its non-operating position. The guide bars 158 are fixedly supported to structure of the pizza making system 20. FIG. 9b is a top plan of the dough punching device 32 in this non-operating position. The slidable support bracket 156 is slidably attached to the guide bars 158 and fixedly attached to the slidable housing 154 which supports the two punching plates 152. A dough punching conveyance system (not shown) is programmed to timely operate the dough punching device 32 after operation of the hot press 30 (shaping the dough into flat cake).

Upon completion of the hot press 30 operation, shaping the dough into flat cake, the pneumatic cylinder 134 lowers the lower press plate 131 back to the position shown in FIG. 3a. At this time, flattened pizza dough rests upon the lower press plate 131. The dough punching conveyance system initiates slidable movements of the dough punching device 32 to an operable position shown in FIG. 3b. This operable position is also illustrated in FIG. 9a.

The pneumatic cylinder 134 raises the lower press plate 131 against a toothed underside of the punching plate 152 thereby dimpling the flattened pizza dough to facilitate uniform and expedited dough baking at a later stage of the automatic pizza making process.

The pneumatic cylinder 134 then lowers the lower press plate 131 to the position shown in FIG. 3a and the dough punching device 32 returns to the non-operable position also illustrated in FIG. 3a.

Referring to FIG. 1, a pneumatic tilting stem 160 is then actuated to lift a distal end of the lower press plate 131 away from the support plate 132, tilting the lower press plate 131 about a hinged attachment point 162 between the lower press plate 131 and the support plate 132 whereby the flattened, perforated pizza dough slides from the lower press plate 131 to a conveying tray 36 positioned under the tomato sauce dispenser 40.

Figure 15A:
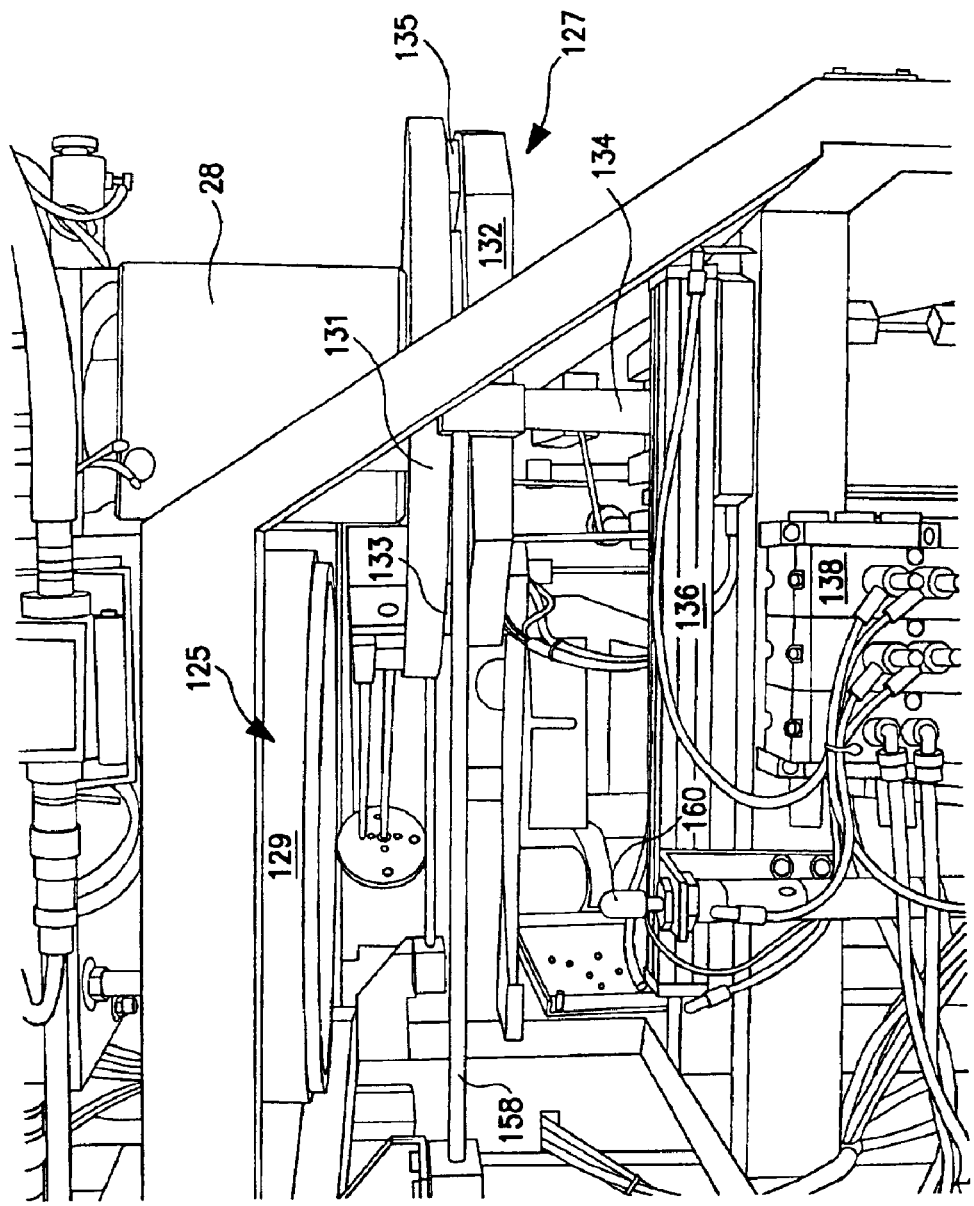

Summary of Dough Shaping and Dough Punching Process (FIGS. 15a through 15f)—Includes Pre-former, Hot Press and Dough Punching Device The entire dough shaping and punching process is summarized below in conjunction with FIGS. 15a through 15f:

FIG. 15a—the lower press portion 127 is slidably positioned along the lateral track 136 with the lower press plate 131 raised to contact the underside of the pre-former 28 to receive the dough ball and shape same into disc form.

FIG. 15b—the lower press portion 127 is lowered away from the pre-former 28 and transports the disc-shaped dough along the lateral track 136 to a position for flattening under the upper press portion 125.

Figure 15C:
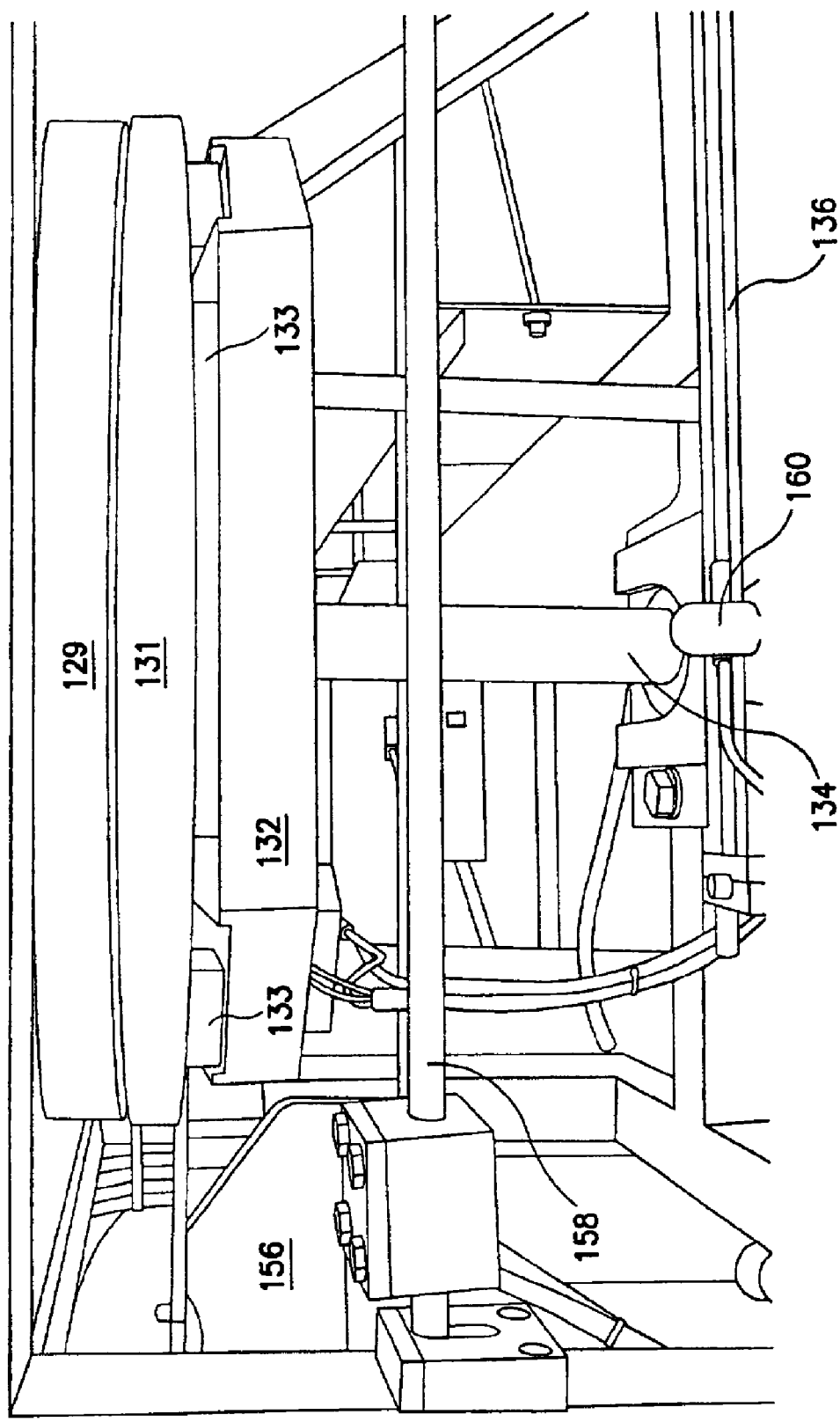

FIG. 15c—the lower press plate 131 is raised by the pneumatic cylinder 134 into contact with the upper press plate 129 to flatten the disc-shaped dough into flat cake for pizza preparation. The upper and the lower press plates 129, 131 are electrically heated to preheat the dough during the dough shaping to expedite the later baking of the pizza.

FIG. 15d—after flattening, the lower press plate 131 is lowered and the dough punching device 32 slides along the guide bars 158 into an operating position under the upper press plate 129.

Figure 15E:
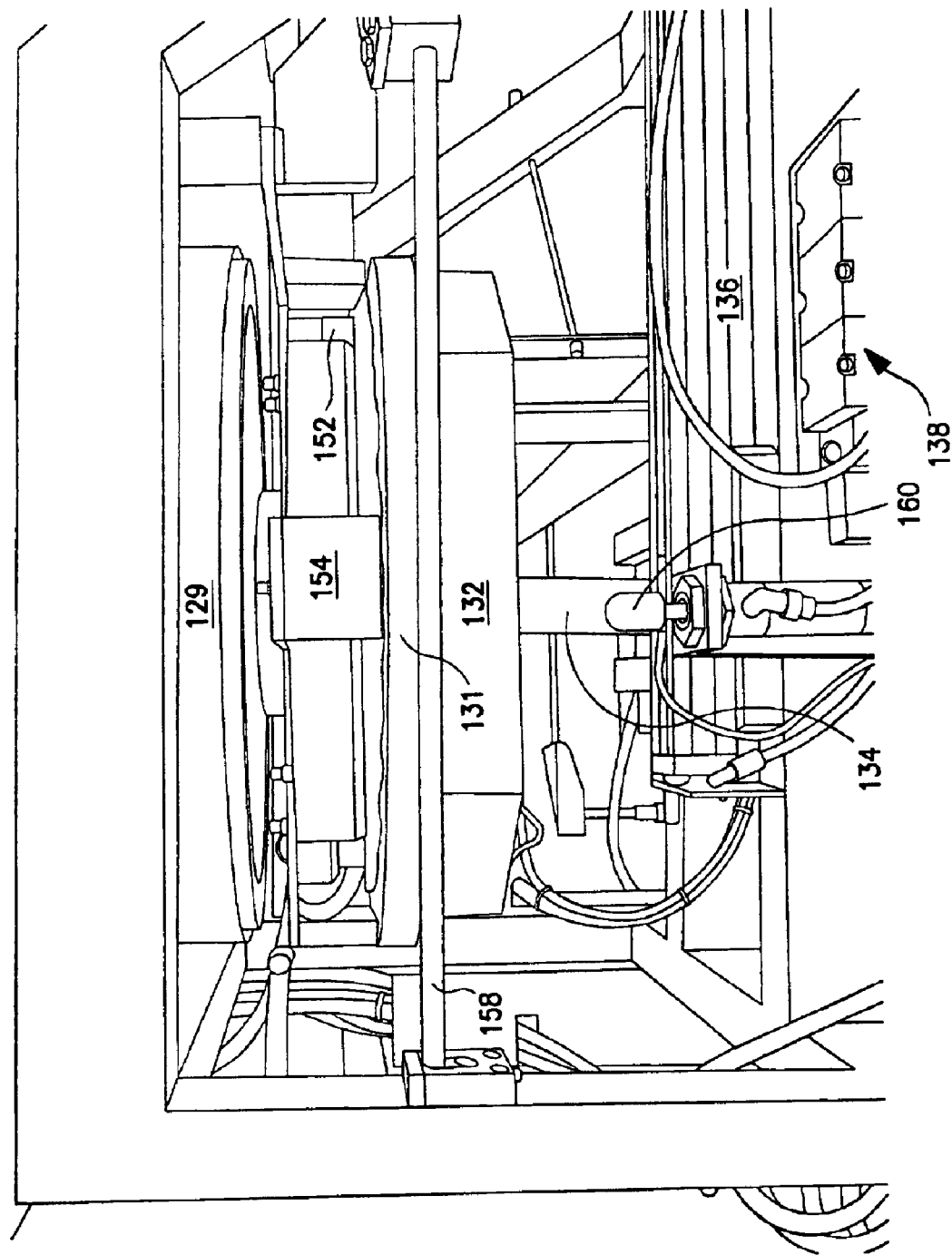

FIG. 15e—the lower press plate 131 is raised into contact with the toothed punching plate 152 thereby dimpling the flattened pizza dough to facilitate uniform and expeditious later baking of the pizza.

FIG. 15f—upon completion of dough shaping and punching, the pneumatic cylinder 134 lowers the lower press plate 131. The pneumatic tilting stem 160 then raises a distal end of the lower press plate 131 tiling same about a hinged attachment point 160 connecting the lower press plate 131 to the support plate 132. The flattened and perforated pizza dough then slides from the lower press plate onto a conveying tray (not shown) under the tomato sauce dispenser 40 (also not shown).

Figure 2:
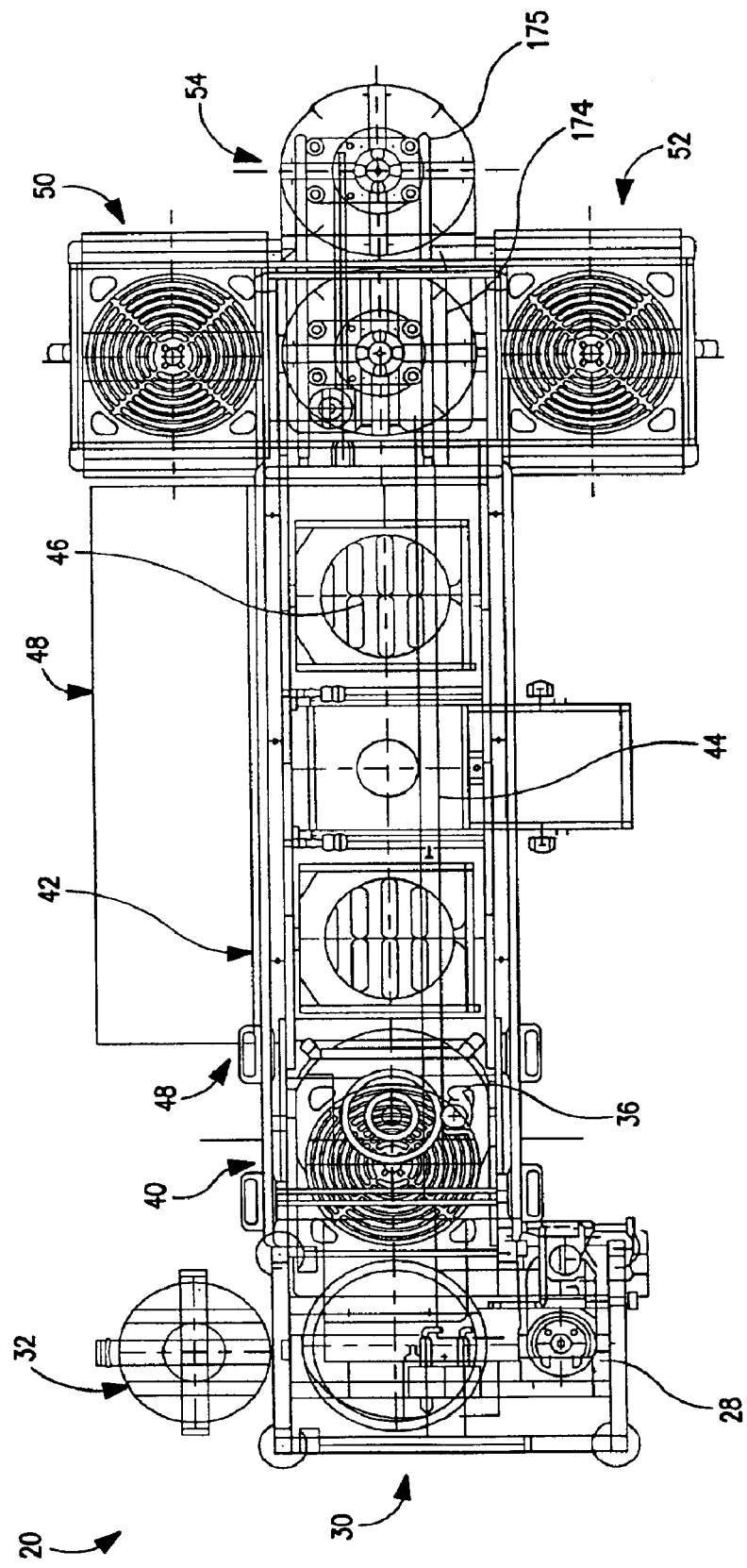
FIG. 2 illustrates a top plan of the automatic pizza making system shown in FIG. 1.

Tray Conveying System (FIGS. 1 and 2)

Referring to FIGS. 1 and 2, the tray conveyor system 38 operates horizontally at level 173 to transport one or more conveying trays 36 at level 172 from the tomato sauce dispenser 40 through cheese dispenser 42, pepperoni dispenser 44 and sausage dispenser 46 to one of two ovens 50, 52.

After dough shaping and punching is complete, and the lower press plate 131 is tilted by the pneumatic tilting stem 160 (as shown in FIG. 1), the receiving rack 34 (tilted as shown in FIG. 1) receives the flattened and perforated dough released by the tilted lower press plate 131. A pneumatic cylinder 171 raises a distal end of the receiving rack 34, tilting the receiving rack about a hinged or pinned attachment point 170 between the receiving rack 34 and structure of the pizza making system 20 until the receiving rack is horizontal as illustrated by position 34a of FIG. 1. The conveying tray 36 is positioned within the receiving rack 34 and is transported by the tray conveyor system 38 away from the receiving rack 34 and aligned precisely below the tomato sauce dispenser for liquid garnishment.

After application by the tomato sauce dispenser 40, the tray conveyor system 38 transports the conveying tray 36 below the various dispensers 42, 44, 46 stopping if programmed below one or more of the dispensers 42, 44, 46 for respective topping application. The tray conveyor system 38 stops the conveying tray 36 at position 174 (shown in FIG. 2) and directs the conveying tray 36 into one of the ovens 50, 52.

The conveying tray 36 remains with the pizza during baking in the oven and returns the pizza to position 174 upon completion of baking. The cutting device 54 transports the prepared pizza from position 174 to a packaging position 175. The conveying tray 36 is transported back and into the receiving rack 34 to receive the next flattened and perforated dough portion for pizza preparation.

The automatic pizza making system 20 as generally illustrated in FIGS. 1 through 4, can accommodate two conveying trays 36 operating simultaneously. As one conveying tray is positioned in one of the ovens 50, 52, a second conveying tray is transporting a flattened and perforated dough portion along the various preparation stations. As the second conveying tray 36 enters the vacant oven, the first conveying tray 36 removes a completed pizza to position 174 and returns to the receiving rack 34 to repeat the preparation process while the second conveying tray 36 remains in the other oven. Accordingly, the automatic pizza making system 20 can accommodate the same number of conveying trays 36 as ovens included in the respective system. Although the automatic pizza making system 20 illustrated in FIGS. 1 through 4, includes two ovens and two conveying trays, the spirit of the present invention envisions various and multiple alternatives in oven and conveying tray design to accommodate the needs of any user.

Tomato Sauce Dispenser (FIGS. 10a through 10d)

The object of the tomato sauce dispenser of the present invention is to meter and apply an even distribution of the tomato sauce on the flattened pizza dough, regardless of the inconsistency in homogeneity of some tomato sauces. The tomato sauce dispenser shall also facilitate easy cleaning and maintenance for good sanitation.

To achieve this object, the tomato sauce dispenser of the present invention equips a nozzle and/or end of a tube through which the sauce supplied with all the motions that are necessary to achieve the even distribution on the sauce without using special conveying means for the sauce through the tube.

The present invention uses a system of the spiral distribution, where the sauce falls onto the flattened pizza dough through a device that rotates about a vertical rotational axis. The rotating device has a threaded spindle that radially shifts the end of the tube or nozzle to dispense the sauce in a horizontal plane above the flattened pizza dough during rotation. Accordingly, the sauce is distributed in a spiral with constant gradient without moving the flattened pizza dough. In order to achieve a homogenous distribution, the speed of rotation (creating the spiral) is constant during the entire garnishing process. The spiral rotation preferably starts at the periphery of the flattened pizza dough and ends at the center. The number of revolutions of the device is increased in relation to the reduction of the radius of the spiral so that the sauce is always deposited onto the pizza at the same speed.

The even and regular distribution in spiral-shape is guaranteed, if it is ensured that the spiral has a constant gradient, the garnishing product is dispensed without interruption and evenly, and in particular that the speed with which the garnishing product touches the basic product is uniform. As an alternative, the even distribution of the garnishing product can also be achieved by adjusting the volume (dispensed volume) in relation to the changed speed with which the garnishing product touches the basic product below.

The tomato sauce dispenser includes a fixed basic frame with two horizontal plates; a friction ring or annular gear is mounted to the bottom plate in the region of a central bore, whereas on the top plate, a bushing is pivoted coaxially to this ring and this bore, which bushing is driven by an electric motor and permanently mounted to bearing plates for a threaded spindle; the rotation of this threaded spindle moves a carriage in the direction of the axis and to radially shift the end of the tube for supplying the sauce. The threaded spindle is driven via a friction disk which is in contact with the friction ring, or via an annular gear that engages the gear ring.

By rotating the bushing and thus the bearing of the threaded spindle in one direction, the radial shifting of the carriage via the threaded spindle in one direction is achieved, for instance, outwardly to the rotational axis of the bushing, whereas the friction disk or toothed gear that is connected with the threaded spindle rolls off the friction ring or annular gear which is mounted to the stationary frame. Reversing the rotational direction of the bushing results in the shifting of the carriage from the area of the rotational axis of the bushing outward, that is, into the margin area of the flattened dough underneath.

The flexible tube for supplying the sauce is routed freely through the rotating bushing. The tube is pivoted in the radially shiftable carriage so that the dispensed sauce can fall freely onto the pizza.

The positioning of the end of the tube prevents the tube from twisting or becoming entangled while the various motions of the device are performed and also allows easy disassembly and replacement of the tube for cleaning and maintenance. The tube is preferably one piece using a peristaltic pump for sauce supply. The invention does not exclude employing a constant rotational speed for the end of the tube dispensing the sauce, whereas the decreased radius of the spiral would result in a reduced volume of sauce being delivered so that the sauce is evenly deposited onto the pizza. In order to limit the required cleaning and to maintain good sanitation, the tomato sauce dispenser allows easy exchange of the tube, using a single exchange part with a single tube coupling.

Figure 10B:
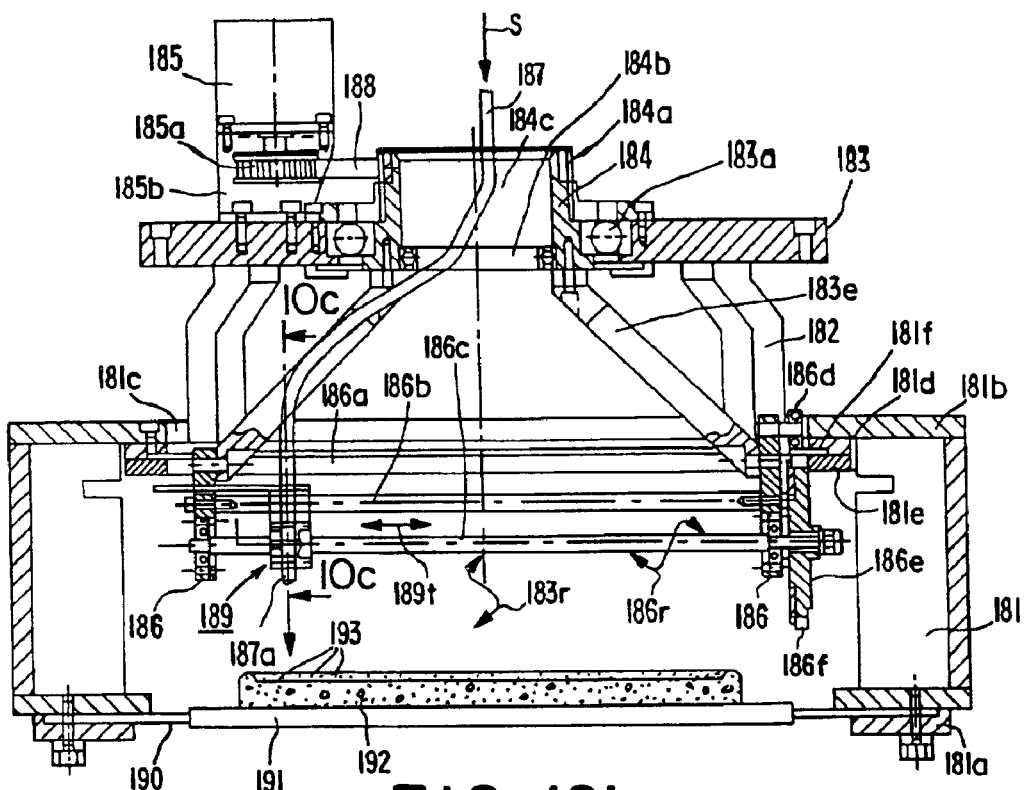
Figure 10A:
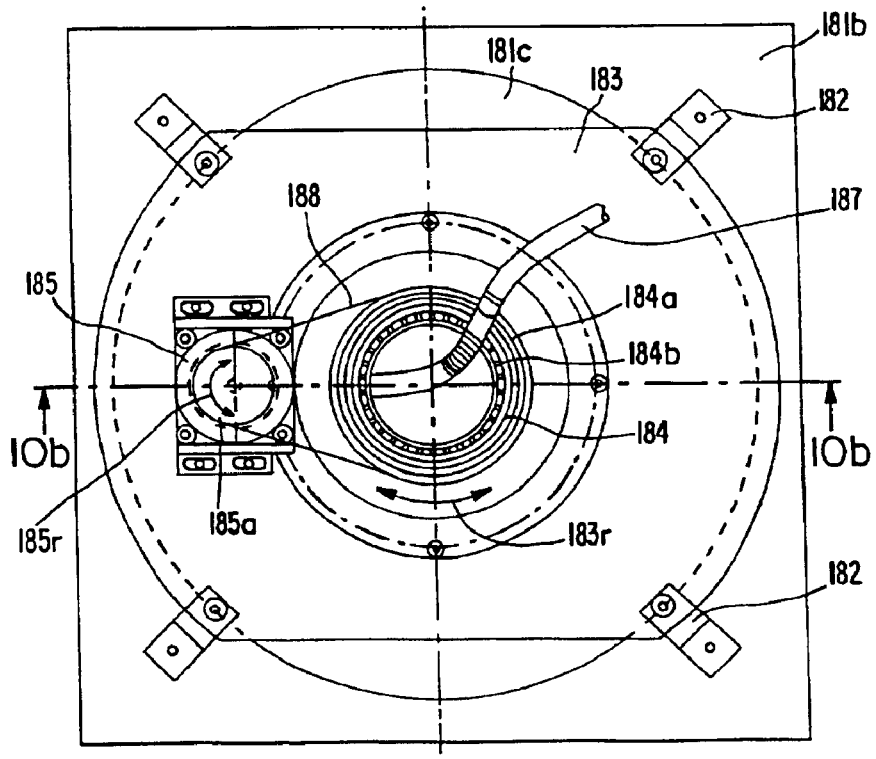
FIG. 10a illustrates a top plan of a tomato sauce dispenser of the automatic pizza making system shown in FIG. 1.
Figure 10C:
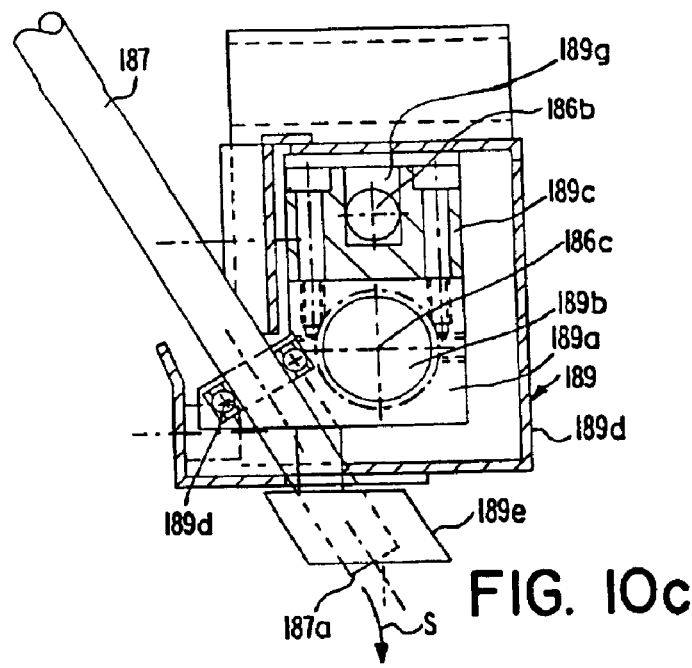
FIG. 10c illustrates a side, partial section of the tomato sauce dispenser according to the plane III—III in FIG. 10b, FIG. 10c detailing a carriage driven by a threaded spindle.
Figure 10D:
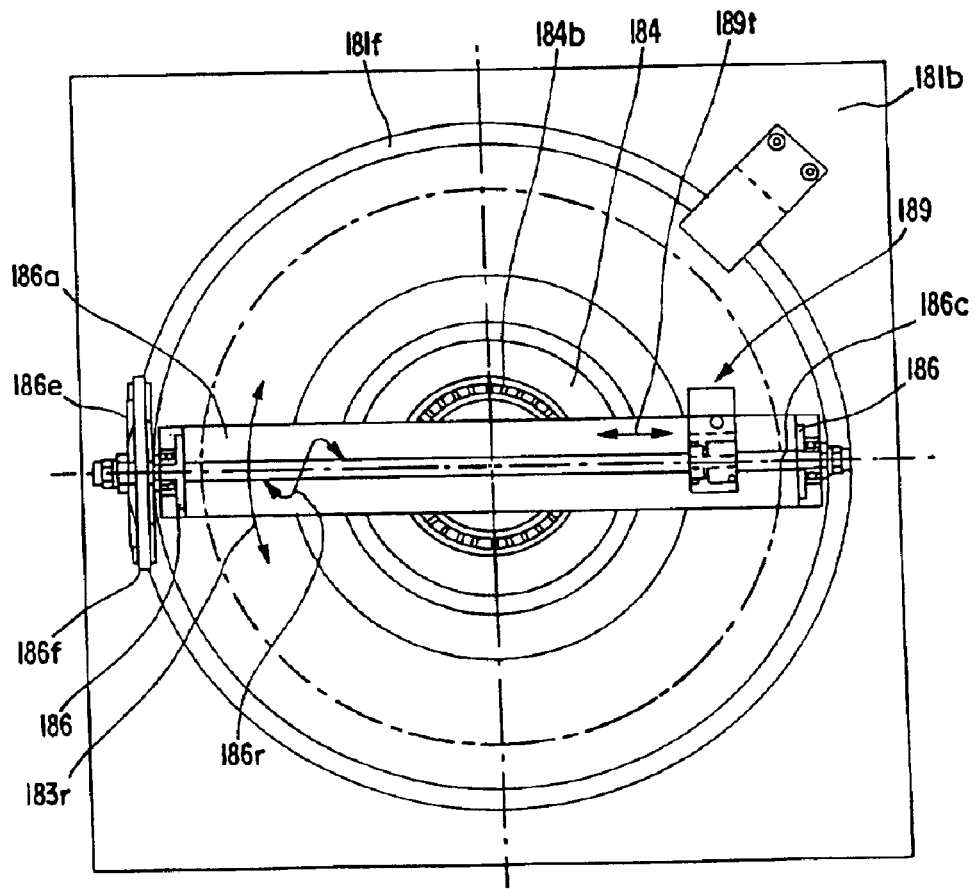
FIG. 10d illustrates a top plan of a tomato sauce dispenser shown in FIG. 1 (without the case), FIG. 10d showing a mounting for the threaded spindle and the carriage.

FIG. 10a illustrates a top plan view of the tomato sauce dispenser according to the present invention. FIG. 10b illustrates a front elevation section according to the plane II—II of FIG. 10a, the plane II—II comprising a vertical axis of the tomato sauce dispenser shown in FIG. 10a. FIG. 10c illustrates a lateral view according to the plane III—III, partly in section, showing the carriage driven by the threaded spindle. FIG. 10d illustrates the top plan view shown in FIG. 10a, without the case, exposing a mounting for the threaded spindle and the carriage.

Lateral carriers 181 are mounted to a frame 190 of a conveyor belt or conveyor chain 191 by clamps 181a, the carriers 181 supporting at their top a plate 181b with central bore 181c.

Above central bore 181c and coaxial to it, a second plate 183 is supported by arms 182, the second plate 183 being spaced parallel to the first plate 181b and centered, in which the second plate 183 has a bushing 184 seated therein such that the bushing 184 can be rotated 183r via ball bearings 183a. On an outer surface of the bushing 184, a pulley or groove 184a is supported for a belt 188 that is used to transfer movement of a pulley 185a of an electric motor 185 to the bushing 184. Two arms 183e are mounted to the bottom of the bushing 184, which arms 183e extend downward and at the end of which vertical parallel bearing plates 186 are mounted for a rotatable 186r threaded spindle 186c, a leading spindle 186b and a connecting element 186a. The threaded spindle 186c is fitted with a friction disk 186e at one of its ends that protrudes over the bearing plates 186, which friction disk 186e rolls off a friction ring 181f with its rubber-coated periphery 186f. The friction ring 181f is mounted to the edge region of the central bore 181c of the plate 181b via rings 181e, 181d. In order to ensure good contact between the periphery 186f of the friction disk 186e and the stationary friction ring 181f, a ball bearing 186d is provided (seated at the same bearing plate 186), which ball bearing 186d provides a friction disk 186e, parallel and perpendicular to the rotational axis above, in order to form a thrust bearing on top of the friction ring 181f.

In accordance with rotation 183r of the bushing 184, the arms 183e and the bearing plates 186 rotate together with the threaded spindle 186c, the spindles 186a, 186b and a movable 189t carriage 189 connected thereto. The rotation 183r occurs when the friction disk 186e rolls on the stationary friction ring 181f, the friction ring 181f being permanently mounted to the plate 181b. The rolling friction disk 186e causes rotation 186r of the threaded spindle 186c, the rotation 186r causing movement 189t in the carriage 189 due to an internally threaded nut 189b within the carriage 189 which engages the rotating threaded spindle 186c. The carriage 189 provides a guide part 189c, the guide part 189c including a seat 189g which glides along the stationary leading spindle 186b. The rotation 186r of the threaded spindle 186c causes the carriage 189 to move 189t along the axis of the threaded spindle 186c, whereas the guide part 189c slides along the stationary leading spindle 186b to prevent the carriage 189 from twisting. This mechanism allows for movement 189t of the carriage 189 to be linked to rotational movement 183r, resulting in a spiral 193 distribution of the tomato sauce S with constant gradient. To ensure that the distribution of the sauce S on the flattened dough 192 is performed with uniform speed and independently of the distance of end 187a of tube 187 from the rotational axis of the bushing 184, and thus from the center of the flattened dough 12 underneath, the number of revolutions of motor 185 during movement 189t of the carriage 189 from the outward area to the center area of the flattened dough 192 increases in relation to the decrease of the radius of the spiral 193.

Tomato Sauce S is supplied under pressure, which pressure can be generated by a peristaltic pump. The sauce S is routed axially via the flexible hose 187 through passage 184c of the rotating bushing 184, which bushing 184 has an internal ball bearing 184b to prevent friction with the tube 187 during rotation 183r. The end 187a of the tube 187 for dispensing the sauce S is pivoted on ball bearing 189d, which is mounted to the carriage 189. The end 187a of the tube 187 is additionally routed through a ring element 189e, which is also mounted to the carriage 189.

The present invention does not exclude that the threaded spindle 186c only extends over an area that is slightly longer than the radius of the flattened dough 192 and that the threaded spindle 186c is driven by a toothed gear, which derives motion from a gear ring, which is connected to stationary structure of the system 20. Furthermore, the invention does not exclude that the tomato sauce dispenser 40 is seated moveably so that it accompanies the flattened dough 192 while it is conveyed on conveying tray 36, without stopping the conveying tray 36, with the tomato sauce dispenser 40 returning to its initial position after the garnishing process is complete.

To achieve a uniform distribution, apart from the above described process which provides a change of rotational speed 183r with a constant supply of sauce S, a process can be used that maintains a constant rotational speed 183r while changing the supply of sauce S delivered in proportion to the change in the radius of the spiral (reducing the radius results in an increased supply capacity of the pump feeding the sauce).

Furthermore, the present invention does not exclude that the bushing 184 is seated within a single plate that covers the height of plate 181b and that has a friction ring 181f or an annular gear. In this alternative embodiment, axial passage 184c of the bushing 184 has a diameter that roughly corresponds to twice the movement distance of the carriage 189. The threaded spindle 186c can also be seated within the passage 184c of the bushing 184. The bushing 184 can also be replaced by a circular plate that is rotatably 183r seated on the stationary plate 181b and has a diametrically or simply radially arranged passage, within which or in the region of which the threaded spindle 186c and the carriage 9 are seated.

Figure 11A:
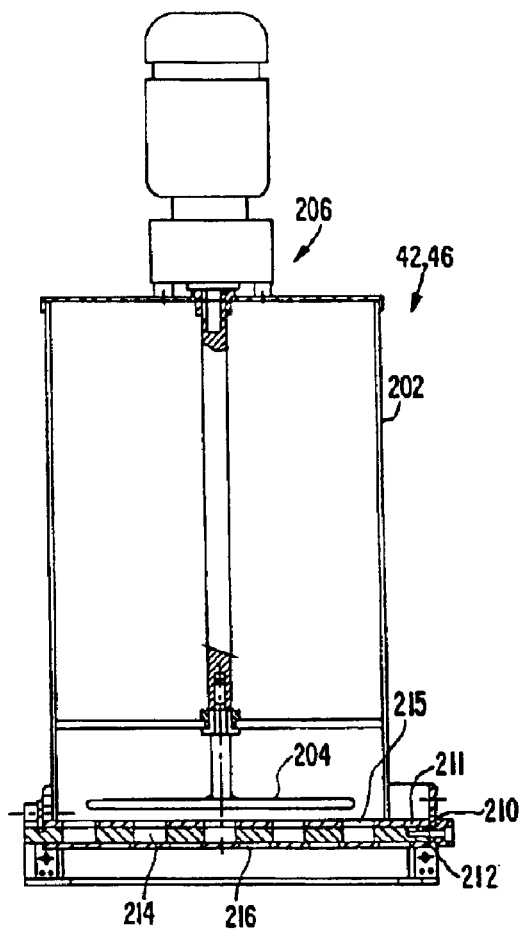
FIGS. 11a through 11c illustrate a left side sectional, a front sectional and a bottom plan, respectfully, of a cheese or sausage dispenser of the automatic pizza making system shown in FIG. 1.
Figure 11B:
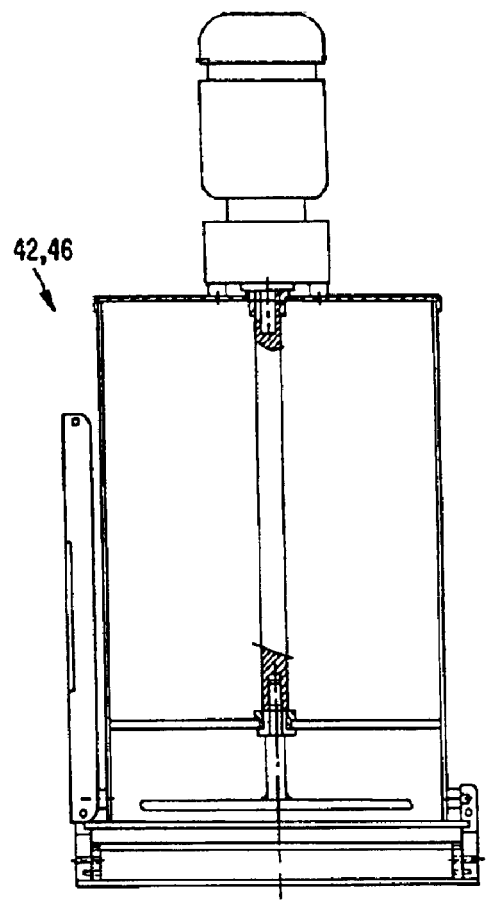
Figure 11C:
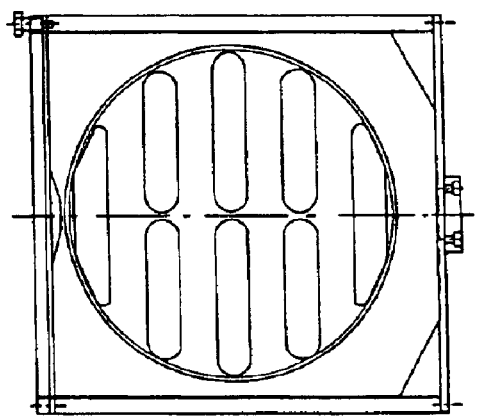
Figure 12D:
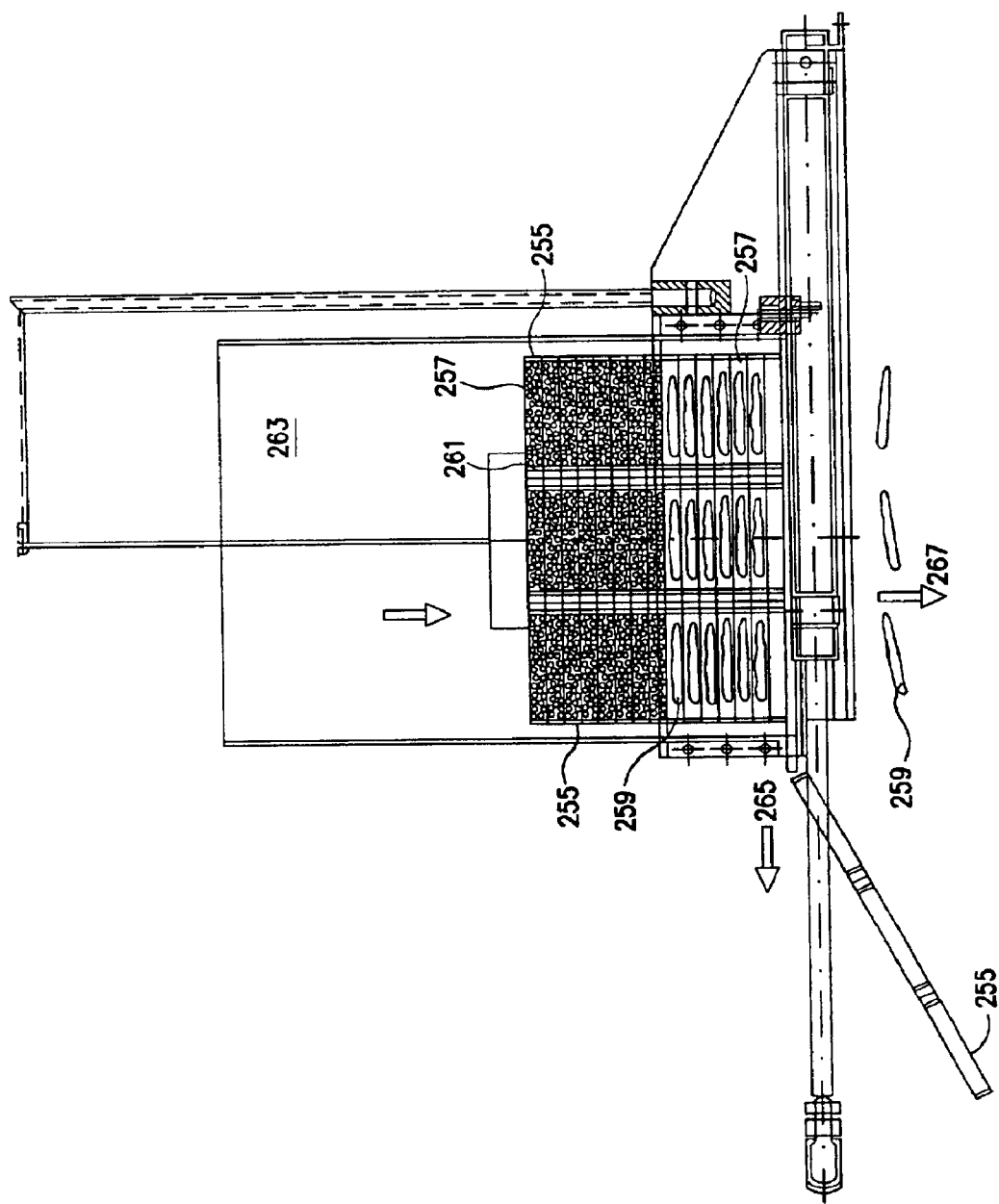

Cheese Dispenser/Sausage Dispenser (FIGS. 11a through 11c)

Cheese and sausage dispenser 42, 46 of the automatic pizza making system 20 suitably applies any type of solid toppings, namely cheese, sausage, mushrooms pepperoni, etc., to the dough base prior to baking the pizza. Accordingly, cheese and sausage dispenser 42, 46 shown in FIGS. 11a through 11c can also be used for the pepperoni dispenser 44 of the automatic pizza making system 20 shown in FIGS. 1 and 2. The cheese and sausage dispenser 42, 46 includes bulk portion control devices.

Cheese and sausage dispenser 42, 46 has a chamber 202 for holding bulk solid topping, a doser 204 attached to the chamber 202 and a motorized stirring device 206 attached to the doser 204 and used to feed the doser 204. The doser 204 includes a slidable plate 210 fitted between two fixed plates 211, 212. One of the fixed plates 211 is attached to the chamber 202 and the second fixed plate 212 is positioned above the pizza. The slidable plate 210 includes a number of openings 214 that are fed with a predetermined amount of solid topping from the chamber 202. As the slidable plate 210 is moved, the openings 215 of the fixed plate 211 (attached to the chamber 202) are closed and the openings 216 of the fixed plate 212 (above the pizza) are opened, allowing portion of solid topping held within the openings 214 of the slidable plate 210 to fall onto the pizza.

Pepperoni Dispenser (FIGS. 12a through 12d)

Pepperoni dispenser 44 of the automatic pizza making system 20 suitably applies any type of solid toppings, namely cheese, sausage, mushrooms pepperoni, etc., to the dough base prior to baking the pizza. Accordingly, pepperoni dispenser 44 as shown in FIGS. 12a through 12d can also be used for the cheese dispenser 42 and the sausage dispenser 46 of the automatic pizza making system 20 shown in FIGS. 1 and 2. The pepperoni dispenser 44 includes mono-dose portion control devices.

The pepperoni dispenser 44 (mono-dose portion device) includes a number of stackable trays 255 having a number of dosing compartments 257 used to hold a solid topping 259. The trays 255 are disposable and have registration features such as a dimple to maintain the trays 255 in alignment when stacked. The trays 255 are preloaded, stacked and stored with toppings 259 and may be held in place by a retainer 261, such as a string, tape or plastic wrap. The trays 255 may be stored in a suitable modified atmosphere 263 for preserving freshness of the solid topping 259.

The toppings 259 are dispensed from the stack of trays 255 as one is removed from the bottom of the stack. This is achieved by the use of the individually spaced dosing compartments 257 that are maintained in a closed position by the bottom most tray in the stack. As each tray 255 is slidably removed 265 from the bottom of the stack, the openings of the tray above it are opened to a pizza maintained below it and the solid topping 259 free fall 267 to the pizza below.

Ovens (FIGS. 13a through 13j)

As shown in FIGS. 1 through 4, and detailed in FIGS. 13a through 13d, the automatic pizza making system 20 includes two ovens 50,52 for baking the freshly made pizza 1 transported to one of the two ovens 50,52 by means of ovenproof plate 302. Each oven 50,52 includes a heat retaining housing, a pneumatic cylinder 312, an opening 304c, and a number of heating elements 307, 308, 310. The electric components of the ovens 50,52 are powered and controlled by a controller.

As the pizza 1 approaches one of the ovens 50,52, the controller activates the pneumatic cylinder 312, which opens the opening 304c allowing the pizza 1 to enter the selected oven 50,52. Once in the oven 50,52, the pizza 1 is baked until done in stages maintained by the controller. The cooking method is determined by many factors, including the intensity, frequency, and duration of heat applied by one or more of the heating elements 307, 308, 310, and the distance between the pizza 1 and the heating elements 307, 308, 310. The intensity, frequency, and duration of the applied heat are set by the controller to achieve desired cooking qualities, such as surface browning, dough texture and crust crispness, each of which can be varied to accommodate consumer preferences.

In one embodiment of the invention, the heating elements include two arrays of infrared heating devices, one set of heating elements 308 including rays in the visible and near-infrared range and the other set of heating elements 307 including rays in the far-infrared range. Infrared rays in the visible and near-infrared range with wavelengths of 0.75 $\mu$m to 3 $\mu$m propagate in accordance with the laws of optics during transmission. Specifically, these rays pass through water molecules, and therefore steam, with little or no absorption. Infrared rays in the far-infrared range with wavelengths of 6 $\mu$m to 1,000 $\mu$m, on the other hand, propagate through space in accordance with the laws of electromagnetics, and are absorbed and converted into radiant energy (i.e., heat) as they pass through matter.

The invention employs a cooking method employing infrared wavelengths in the visible and near-infrared range concurrently or staggered with infrared wavelengths in the far-infrared range. When pizza cooking, the infrared rays with wavelengths in the visible and near-infrared range penetrate the pizza, in the presence of water (in the form of water vapor), to a depth of about 10 mm to 15 mm. Infrared rays in the far-infrared range penetrate about 0.5 mm to 0.8 mm.

To maintain the depth of penetration of the infrared rays in the visible and near-infrared range, the outer layer of the pizza or thin cake should remain moist during cooking, as that would maintain a layer capable of absorbing all or most of the visible and near-infrared radiation, preventing the rays from failing to penetrate the pizza and excessively overheating the outer layer with respect to the rest of the dough. It is an object of the present invention, therefore, for infrared rays in the visible and near-infrared range to predominate initially, and for rays in the far-infrared range to be applied at the very end of the cooking process for surface browning. The cooking method of the present invention also calls for an initial heating cycle of a given duration, which raises the temperature of the thin cake very rapidly, quickly overcoming the thermal inertia of the dough and compensating for heat energy lost to the dispersal of fermentation gases, the evaporation of ethyl alcohol produced as the dough rises and the formation of water vapor.

The cooking method then calls for a programmed series of heating cycles of decreasing duration with intervals between them that can be varied to prevent too much moisture from evaporating quickly from the thin cake, thereby sustaining deep penetration of the rays in the visible and near-infrared range for as long as possible. In a final stage the thin cake is heated for approximately the same amount of time as the initial heating period. This forms dextrins in the crust, which browns to form a thin textured layer, and imparts aroma and crispness through dextrinization and pyrolysis of starch.

An oven built according to the invention and operating according to the disclosed cooking method can cook and brown a topped pizza in approximately 55 seconds. In addition, the thermal inertia of the housing of the oven is as low as possible, since its internal surfaces are shaped to reflect the rays onto the thin cake. In another embodiment of the invention, some or all of the radiation sources are mounted to move (with or without reflectors), thereby varying the distance from the source to the surface of the thin cake during the cooking process.

The present invention could also include the use of a microwave generating magnetron, in addition to the sources of infrared rays. For fast cooking, a radiation or heat source could also be positioned below the pizza. In such an event, lamps emitting infrared rays in the far-infrared range could be used as a radiation source, and the thin cake could be supported on a perforated plate or grille such that at least some of the rays act directly on the thin cake while some heat the support which transfers heat to the thin cake by contact. If an induction unit is included in the oven, the plate is made of metal and provided with slits, or spiral or concentric circular openings, to transfer the heat by contact.

The cooking method of the present invention may call for programming of the radiation and/or heat sources depending upon the toppings on the pizza to accordingly vary the heating times, the number and duration of heating cycles, the intensity (e.g., heating using a larger or smaller number of units), the distance between the sources and the pizza and/or the position or shape of the reflectors, if any.

The oven of the present invention could be a bell-type oven having a stationary lower part and a moveable upper part to facilitate oven feeding using a mechanical transport means and to limit the cooking volume of the oven by completely shielding the radiation. However, the invention does not preclude application of the cooking method to other types of ovens, such as tunnel or muffle ovens. Also, the radiation sources, specifically the induction unit, may act independently of the infrared lamps or partially in conjunction with the radiation sources.

FIG. 13a illustrates a sectional view of ovens 50, 52 along a vertical plane parallel to the longitudinal axis of the transport mechanism of the system 20 and transverse to the lamps. The upper part of the oven is provided with lamps emitting infrared rays in the visible and near-infrared range and lamps emitting infrared rays in the far-infrared range. The upper part of the oven moves vertically, and is shown in a raised position with the transport plate and pizza in the cooking position. The stationary lower part of the oven is provided solely with lamps emitting infrared rays in the far-infrared range.

FIG. 13b illustrates a sectional view of the oven in FIG. 13a along a vertical plane parallel to the arrangement of the lamps.

Figure 13D:
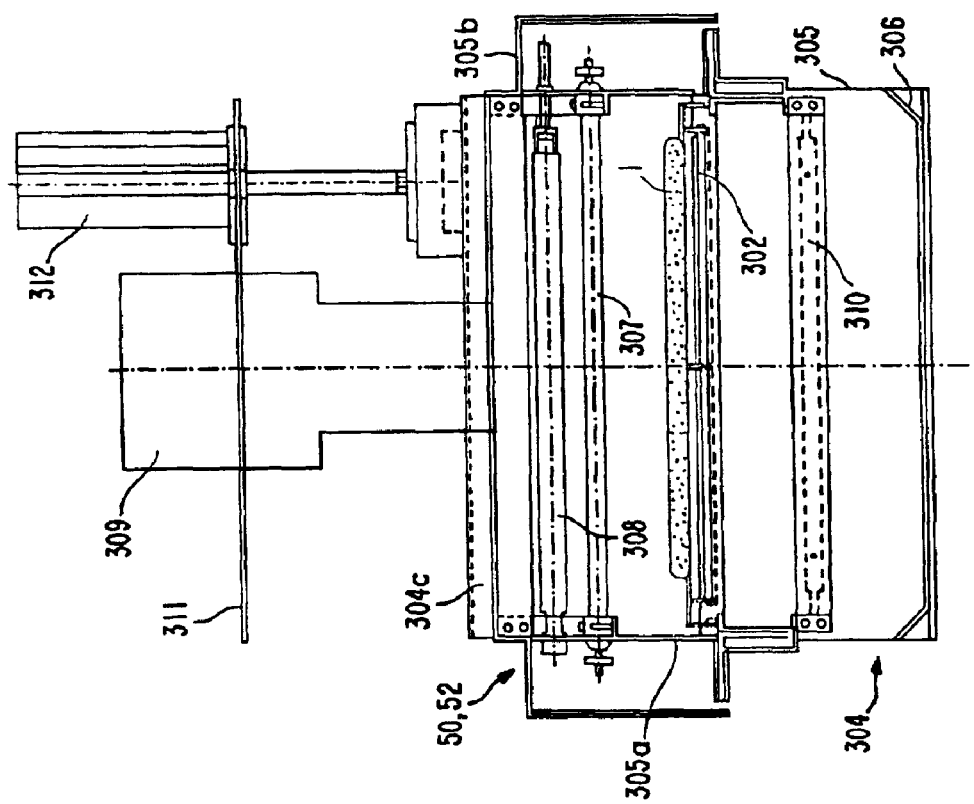
FIGS. 13a through 13d illustrate various side and front elevations of each of two ovens included in the automatic pizza making system shown in FIG. 1 with FIGS. 13e and 13f detailing the cooking method employed by the ovens.
Figure 13C:
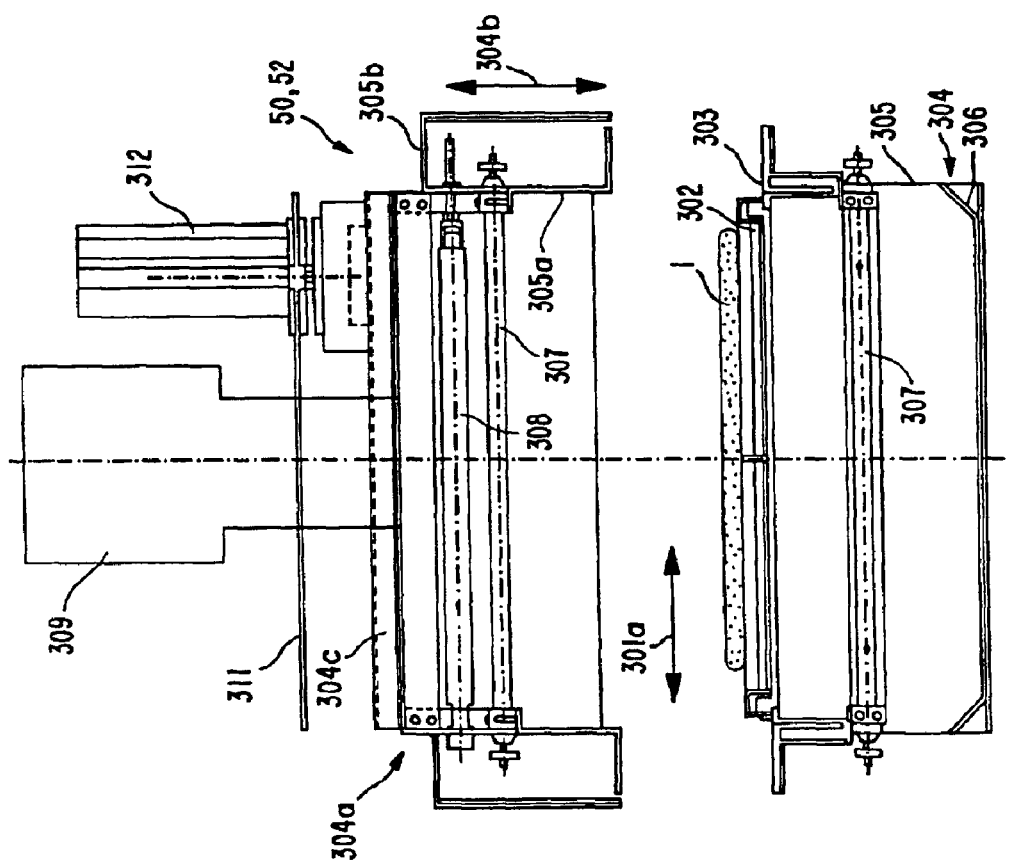

FIG. 13c illustrates a sectional view of an oven built and equipped similar to the oven shown in FIG. 13b, the upper part additionally provided with a microwave emitting magnetron.

FIG. 13d illustrates a sectional view of the oven in FIG. 13c in a closed position, and replacing the infrared lamps in the lower part with an induction unit.

Figure 13E:
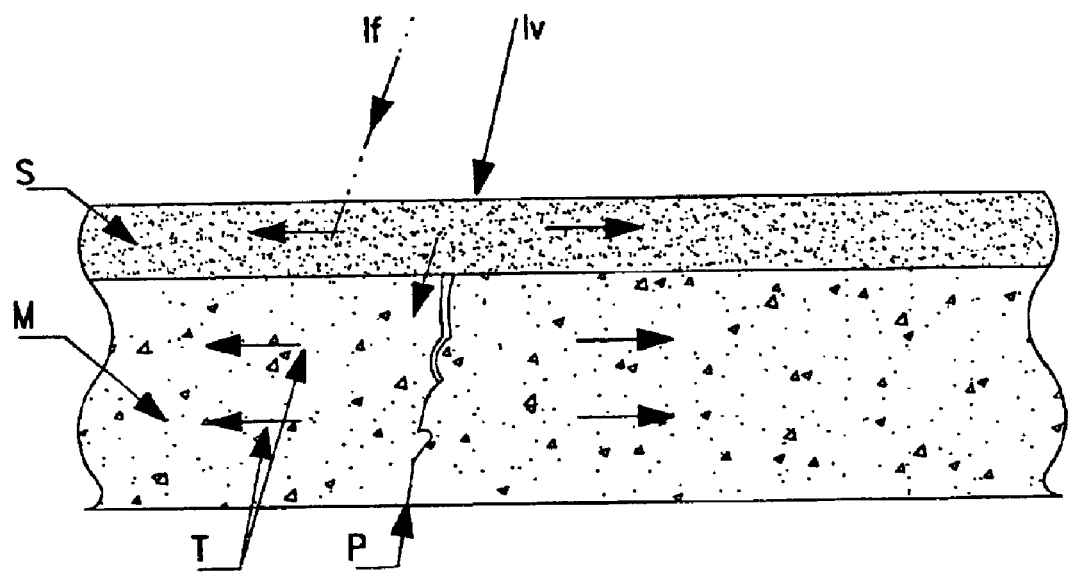

FIG. 13e illustrates a schematic diagram of the penetration of infrared rays and transmission of heat into the thin cake being cooked.

Figure 13F:
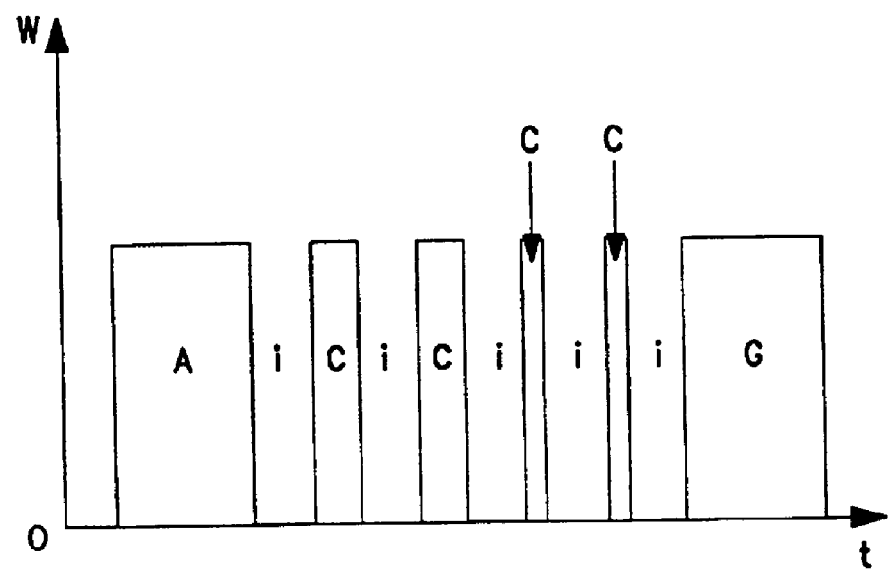

FIG. 13f illustrates a simplified diagram of the cooking method according to the invention.

The ovens 50,52 are bell-type ovens attached to a known horizontal transport mechanism 303 for a plate 302 supporting the pizza 1. The lower part 304 of the ovens 50,52 is mounted stationary on the frame of the transport mechanism 303 with a pan 306 at the bottom that can be removed for cleaning. The frame 305 of the lower part 304 can be made from sheet metal with heat retaining internal surfaces, or the frame 305 could be provided with reflectors. The lower part 304 of the ovens 50,52 can include lamps 307 emitting infrared rays in the far-infrared range (FIGS. 13a, 13b, and 13c) or an induction unit 310 (FIG. 13d). If the lower part 304 includes infrared lamps 307, the lamps may be mounted stationary with respect to the pizza 1, or mounted such that the distance from the pizza 1 could be vertically adjusted during various cooking cycles. In such event, the plate 302 is perforated or grille-shaped. If the lower part 304 includes an induction unit 310 (FIG. 13d), the transport plate 302 is metal and provided with slits, or spiral or concentric circular openings.

The upper part 304a of the oven 50,52 can be moved vertically 304b by a pneumatic cylinder 312 anchored to a stationary frame 311 of the transport mechanism, whose piston acts upon a reinforced top 304c of the bell 305a. The inside of the bell 305a is provided with an array of lamps 307 emitting infrared rays in the far-infrared range and, above them, lamps 308 emitting infrared rays in the visible and near-infrared range.

The two sets of lamps 307,308 may be mounted at a given fixed distance from the pizza 1 being cooked, or one or both sets of lamps 307,308 may be mounted so that the distance can be adjusted prior to or during the individual cooking cycles. Of course, the invention does not preclude using lamps 307,308 that are ring-shaped or shaped differently than as shown in the drawings.

Lamps 308 emitting infrared rays in the visible and near-infrared range are normally provided with internal reflectors. However, the invention does not preclude the use of special reflectors for one or both types of the lamps 307,308. The reflectors can be mounted stationary so that they can be adjusted along with the lamps, and/or the reflectors may be mounted so that they can be adjusted and/or reshaped independently of the lamps, in order to vary the concentration of rays on the pizza 1 being cooked.

The upper part 304a of the oven 50,52 may also be provided with magnetrons 309 to assist the lamps 307,308 in overcoming the thermal inertia of the thin cake, and/or for cooking toppings with little or no moisture content, and/or decreasing the duration of the final surface browning cycle.

In one embodiment of the invention, the lower part 304 and the upper part 304a of the oven 50,52 are made from a thin material with low thermal resistance, having a double wall 305b providing protection and safety, and thermal insulation having no significant influence on cooking time or energy consumption.

The cooking method of the present invention is based on the specific penetration properties of infrared wavelengths in the visible and near-infrared range emitted by lamps 308, and the infrared wavelengths in the far-infrared range emitted by lamps 307. Referring now to FIG. 13e, in the presence of water molecules (and water vapor as well) infrared wavelengths in the visible and near-infrared range "Iv" penetrate "P" through the top surface "S" and into the dough "M" of the pizza or thin cake. These wavelengths are absorbed and converted into heat energy as they pass through (nontransparent) matter, transferring the heat "T" to the surrounding dough. By contrast, the infrared wavelengths in the far-infrared range "If" emitted by the lamps 307 only penetrate to a depth of 0.4 mm to 0.8 mm. As a result, these wavelengths only act on the top surface "S" of the pizza being cooked.

Referring now to FIG. 13f, to fully and quickly cook the pizza or thin cake 1, the invention employs an initial heating cycle "A", including exposure to infrared rays in both the "Iv" and "If" ranges, during which the mass of dough "M" and top surface "S" are preheated without excessively drying the top surface "S". The initial cycle "A" is followed by a series of cycles "C" of varying but generally decreasing duration, during which infrared rays in the "Iv" and "If" ranges alternate with intervals "I" between the cycles to allow water molecules to diffuse into the top surface "S" in the form of steam, so that the "Iv" wavelengths can penetrate "P" into the dough "M". Such penetration "P" naturally decreases as the moisture decreases and water vapor evaporates. The top surface "S" is browned during the extended final cycle "G", using "Iv" and "If" wavelengths, since the "Iv" wavelengths now concentrate in the top surface "S" due to the decreasing moisture content in the top surface "S", thereby reinforcing the "If" wavelengths to heat, dry, and brown the top surface The cooking method of the present invention also modulates the energy emitted in the form of "Iv" and "If" wavelengths for the various cycles "A", "C" and "G" by differentiating the time the two types of infrared lamps 307,308 are lit, and/or by varying the number of lamps lit, and/or by varying the position of the lit lamps in relation to the pizza or thin cake 1, and/or by the position or shape of the reflectors.

In addition, the cooking method could include the combined action of a microwave generator (magnetron) 309 and/or an induction unit 310 in conjunction with the infrared lamps 307,308. The additional devices 309,310 can emit energy during all or part of the cycles "A", "C" and "G" described above, including all or part of the intervals "i" between the cycles, or solely during the intervals "i".

Automatic Cutting Device (FIGS. 14a through 14j)

The automatic cutting device of the present invention provides a simple, easy-to-clean cutting and transfer device that uses some of its cutting movements to transfer the pizza. The cutting device attaches a sheet that slides vertically by its own weight or by spring action to a side of a plate provided with blades. After cutting the pizza, the sheet holds the cut pizza in the cutting position as the plate that supports the pizza during cutting moves horizontally, dropping the pizza onto the top box of a stack of take-out boxes disposed below. Alternatively, the sheet assists the transfer of the pizza onto a take-out box to one side as the entire cutting device moves laterally, lifting the plate provided with blades once the pizza is placed on the box.

The cutting device also provides blades that can easily be detached from the plate that holds them for replacement and cleaning, regardless of whether said blades are interchangeable with single-use blades or coated with a sheath or layer that can be removed easily at the end of a predetermined cutting cycle, thereby making the cutting device as hygienic as possible.

For an embodiment of the present invention having mechanisms that move laterally, the cutting device is mounted to move in the direction of transfer of the pizza, providing a support for the take-out box or other packaging. To transfer the cut pizza from the cutting position to the packaging position, the plate provided with blades and vertically sliding sheet remains in the lowered, cutting position, or lifts slightly, as it moves toward the packaging position, dragging the pizza and sliding it off the transport plate onto the box positioned alongside. Once properly positioned over the box, the plate provided with blades lifts and moves back into position over the cutting area.

A threaded rod and nut screw can advantageously be used to move the cutting device. The cutting mechanism is mounted on a carriage assembly that rolls on tracks. Rotating the threaded rod mounted on a stationary frame moves a nut screw attached to the carriage assembly. However, the invention does not rule out using a pneumatic or hydraulic cylinder, or mechanical means such as chains, belts or rackwork to move the cutting mechanism.

Two embodiments of the pizza cutting and transfer device according to the present invention are illustrated in the accompanying drawings, which are not intended to limit the scope of the invention.

Figure 14C:
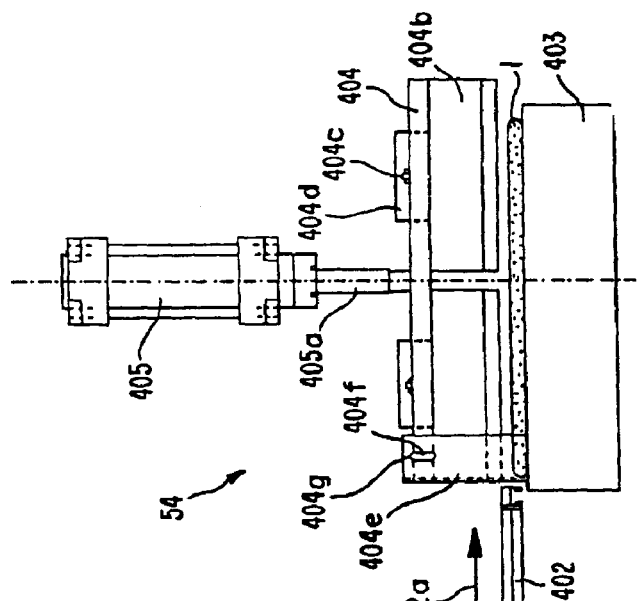
FIGS. 14a through 14c illustrate front views of one embodiment of an automatic cutting and transfer device of the present invention where a movable transfer plate is responsible for transferring a cut pizza into a box for packaging.
Figure 14B:
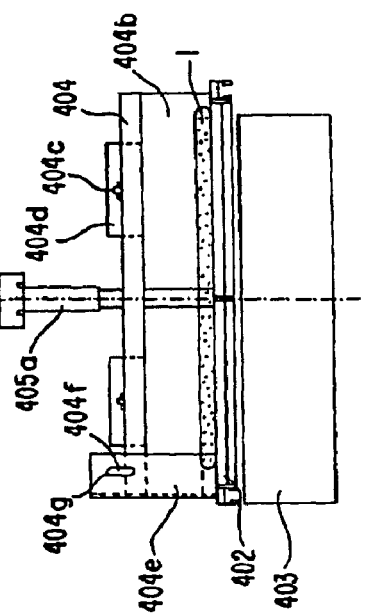
Figure 14A:
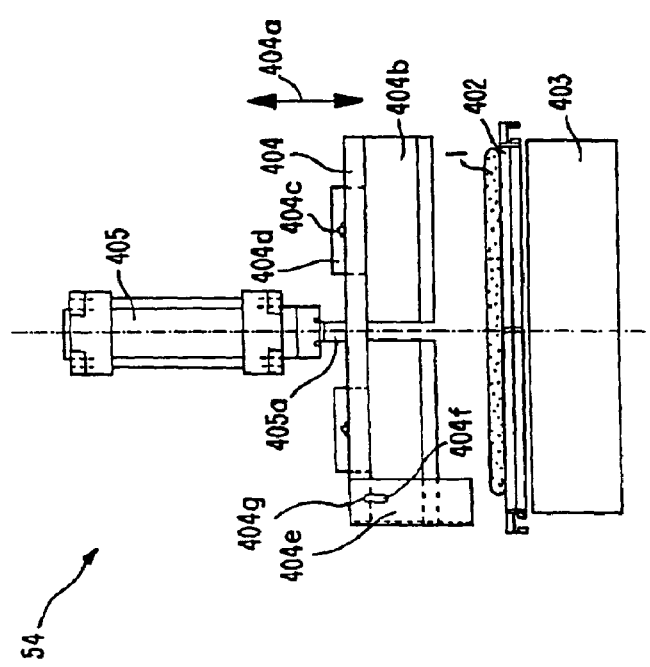

FIG. 14a illustrates a front view of one embodiment of the automatic cutting and transfer device, showing a plate provided with interchangeable blades and a vertically sliding sheet in a raised position over the pizza, the pizza resting on a movable transport plate in a position above a stack of take-out boxes.

FIG. 14b illustrates a front view of the cutting and transfer device of FIG. 1, showing the plate provided with interchangeable blades in a lowered, cutting position with a lower edge of the vertically sliding sheet resting on a top surface of the movable transport plate.

FIG. 14c illustrates a front view of the cutting and transfer device of FIG. 1, showing the transport plate after it has moved from the cutting position with the plate provided with blades in a lowered position and the pizza resting on the top take-out box in the stack of boxes underneath.

Figure 14F:
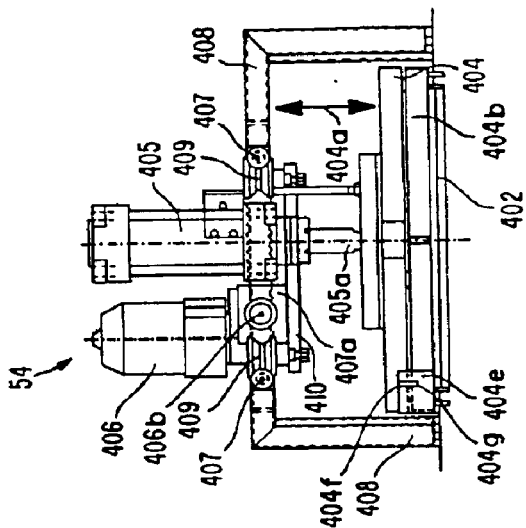
FIGS. 14d through 14f illustrate front, top and left side views, respectively, of another embodiment of an automatic cutting and transfer device of the present invention (and the embodiment shown in the automatic pizza making system of FIG. 1), where the entire cutting device moves to transfer the cut pizza from a cutting position to a packaging position.
Figure 14D:
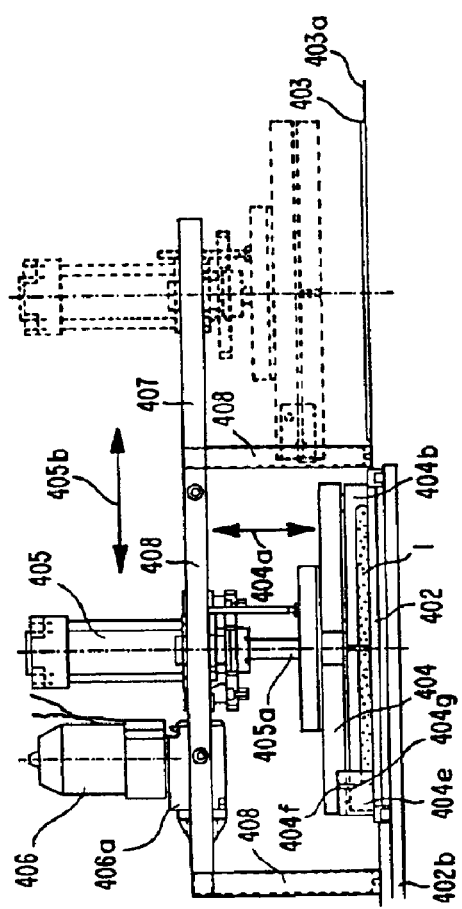

FIG. 14d illustrates a front view of another embodiment of the automatic cutting and transfer device, where the cutting device transfers the pizza by dragging the pizza as it moves. The plate provided with stationary blades and a vertically sliding sheet is shown in a lowered, cutting position, while dotted lines show the cutting device in a raised position after moving to a packaging position.

Figure 14E:
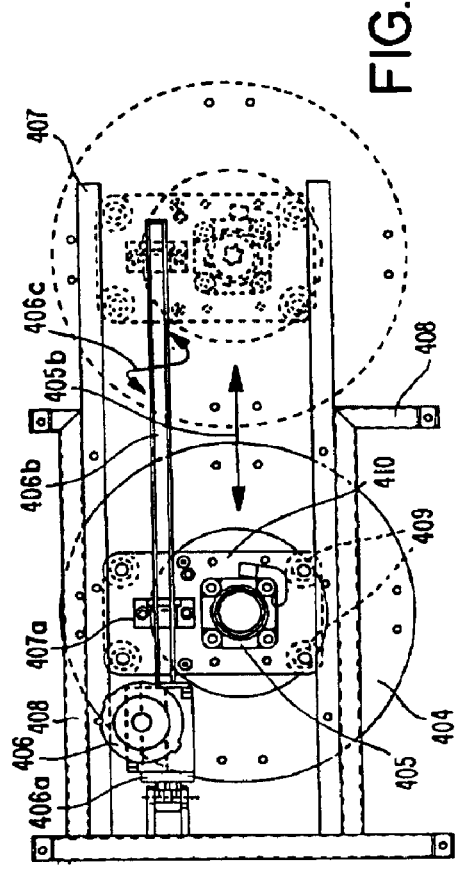

FIG. 14e illustrates a top view of the cutting and transfer device of FIG. 14d.

FIG. 14f is a left side view of the cutting and transfer device of FIG. 14d.

The cutting and transfer device 54 for pizza 1 or focaccia according to the present invention includes a circular plate 404, having fixed or interchangeable vertical blades 404b attached to the bottom thereof, and a sheet 404e that slides vertically by its own weight or by spring action on stationary pins 404g on the edge of the plate 404. The pins 404g engage in corresponding vertical slots 404f in the vertical sliding sheet 404e.

If interchangeable blades 404b are used (as shown in FIGS. 14a, 14b, 14c), the plate 404 is provided with a series of radial cuts for insertion of upper tabs 404d of the interchangeable blades 404b, the tabs 404d being provided with a hole into which small pins or cotters 404c are inserted transversely to hold the tabs 404d in place. Specifically, the fixed blades (as shown in FIGS. 14c, 14d, 14e) or interchangeable blades can be coated with a layer (e.g., applied by immersion, spraying on, or as a preformed sheath made from paper or plastic) that can be removed for easy cleaning of the blades. The plate 404, together with the blades 404b and vertical sliding sheet 404e, can be moved vertically 404a by a pneumatic cylinder 405 with a rod 405a and piston.

The cutting device of the present invention is substantially identical for the two embodiments illustrated in the figures, whereby the transport plate 402 transfers the pizza 1 to the take-out box 403 or other packaging. The sliding sheet 404e mounted laterally on the plate 404 provided with blades 404b performs one of two functions. The sliding sheet 404e may act simply as a projection to catch the edge of the pizza 1 and hold it while the transport plate 402 moves 402a from the cutting position, leaving the pizza 1 resting on the top take-out box in the stack 403 of boxes disposed below the cutting position (FIG. 14c). Alternatively, the sliding sheet 404e may act as a transfer means to push 405b the pizza 1, sliding the pizza 1 off the transport plate 402 in the cutting position onto the box 403 in a packaging position (FIG. 14d). In the latter case, the transfer plate 402 may be replaced by a conveyor belt or other known transport means.

Figure 4:
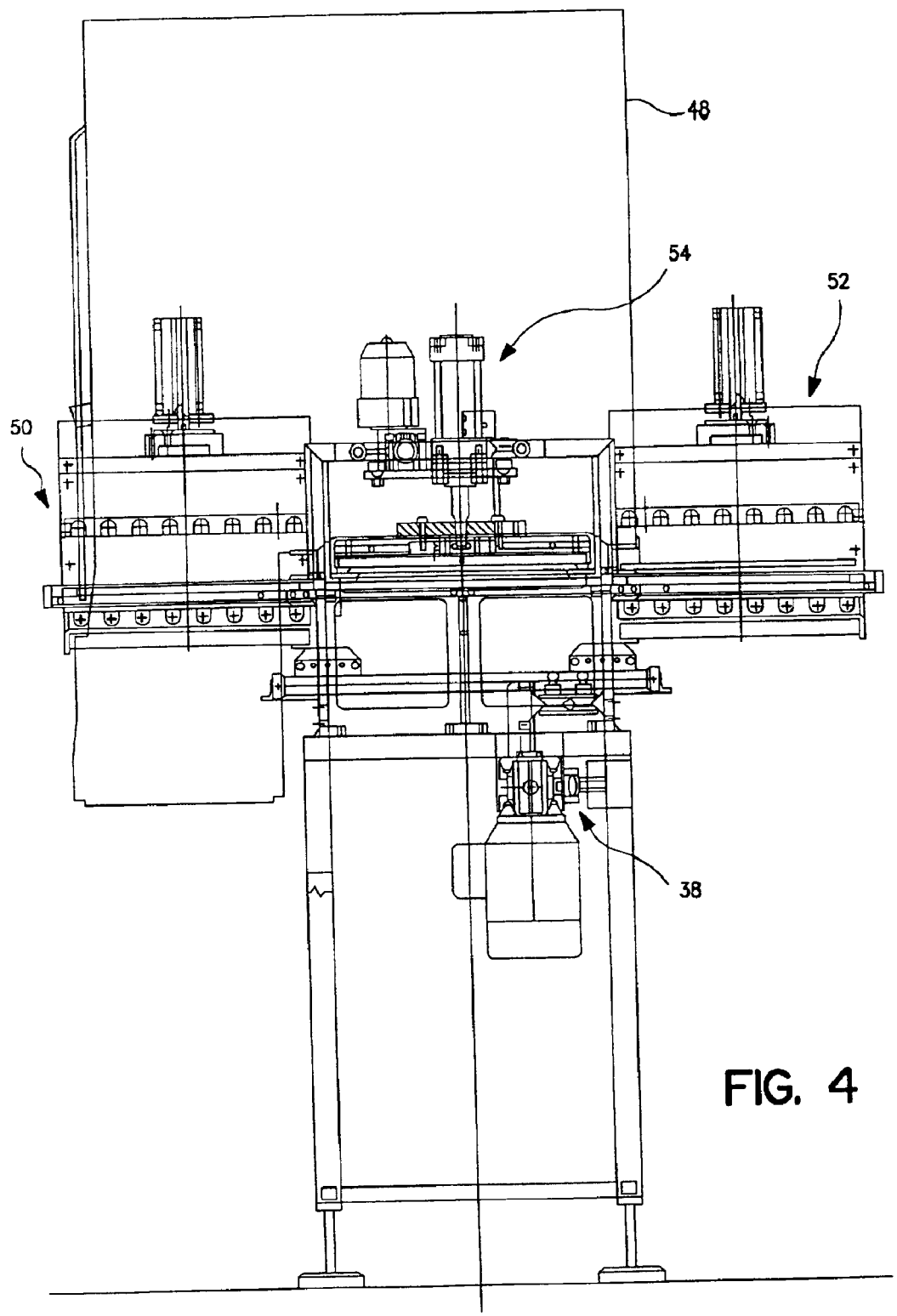
FIG. 4 illustrates an elevation of the automatic pizza making system according to the plane 4—4 in FIG. 1, FIG. 4 viewing through a refrigerator to a cutting device, two ovens and a tray conveying system.

In the embodiment (FIGS. 14d, 14e, 14f) where the sliding sheet 404e acts as a transfer means (this embodiment is also shown in FIGS. 1, 2 and 4), the cutting device 54 includes the plate 404 provided with blades 404b and vertically sliding sheet 404e, and includes a cylinder 405 with a rod 405a and piston mounted to move horizontally 405b by a plate 410 fastened to the cylinder 405 and provided with four wheels 409 which roll on parallel, horizontal tracks 407 mounted on a stationary frame 408. A nut screw 407a is anchored to the plate 410 and receives a threaded rod 406b driven 406c by a motor 406 provided with a reduction unit 406a, all forming a single piece with the stationary frame 408. As the threaded rod 406b is rotated in one direction or the other 406c, the nut screw 407a (along with the plate 410 and the cutting device 404, 404b, 405) moves 405b between the cutting position (174 in FIG. 2) and the packaging position (175 in FIG. 2), 10 where a take-out box 403 or other packaging is predisposed on a support 403a.

For the FIG. 14d, 14e, 14f embodiment, where the cutting mechanism moves horizontally, the pizza 1 is cut and transferred to the take-out box 403 or other packaging in the following stages:

The cooked pizza 1 on the transport plate 402 is moved into the cutting position by transfer means 402b.

The pizza 1 is cut by lowering 404a the plate 404 provided with blades 404b. The sheet 404e rests on the top surface of the transport plate 402.

The blades 404b lift almost imperceptibly from the surface of the transport plate 402. The sliding sheet 404e continues to rest on the surface by its own weight.

The threaded rod 406b rotates 406c, moving 405b the cutting device 404, 404b, 405, 405a toward the packaging position. The blades 404b and sheet 404e drag the cut pizza 1 off the plate 402 onto the box 403 that rests on support 403a.

The plate 404 and blades 404b lift 404a.

The cutting device 404, 404b, 405, 405a moves 405b to the cutting position for the next cooked pizza 1.

An advantage of the pizza cutting and transfer device 54 of the present invention is that it can be employed independently of the type of discontinuous or continuous mechanism used to transport the pizza 1 into the cutting position (single plate, chain-driven series of plates, belt) or the method used to stock the packaging position (packaging disposed in stacks or individually).

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention.

What is claimed is:

1. A multiple station apparatus for automated preparation of a pizza, the apparatus comprising:
  a. at least one dough mixer that prepares individual and pre-determined portions of dough from flour and other component ingredients and includes:
    a closed housing having two inner, essentially circular, juxtaposed and separated surfaces between which two casing surface sections extend which run in an arc and change in the upper and lower region into a flat surface section; and
    a kneading element including:
      at least one fixed pin extending from an arm communicating with a drive shaft of the kneading element and having a longitudinal axis parallel to a rotational axis of the drive shaft; and
      a sleeve rotatably attached to each pin, the sleeve capable of free spin about a longitudinal axis of the fixed pin;
  b. at least one shaping device that shapes the fresh dough to a flattened pizza base of pre-determined dimension;
  c. at least one metering and dispensing device that apportions and applies a pre-determined amount of at least one topping to the pizza base to form a pizza; and
  d. at least one oven that cooks the pizza.

2. A multiple station apparatus for automated preparation of a pizza, the apparatus comprising:
  a. at least one dough mixer that prepares individual and pre-determined portions of dough from flour and other component ingredients, wherein the at least one dough mixer includes:
    a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade when the housing is in a closed position; and
    a kneading element operating with a rotational axis coaxial or parallel to the housing axis;
  b. at least one shaping device that shapes the fresh dough to a flattened pizza base of pre-determined dimension;
  c. at least one metering and dispensing device that apportions and applies a pre-determined amount of at least one topping to the pizza base to form a pizza;
  d. at least one oven that cooks the pizza; and
  e. a transport system that transports the dough portion, the flattened pizza base and the pizza through the multiple station apparatus.

3. The apparatus of claim 2, wherein the dough mixer further includes a cross piece to the casing surface sections and to the level surface sections, located along a perimeter of each circular surface, the cross piece having a large rounding-off radius.

4. The apparatus of claim 2, wherein one circular surface of the closed housing, across from a circular surface from which a drive shaft extends for the kneading element, has a slight conical or domed form projecting into the housing, coaxially to the rotational axis of the kneading element.

5. The apparatus of claim 2, wherein one circular surface of the closed housing, across from a circular surface from which a drive shaft extends for the kneading element, has a distinctive conical, nose cone-shaped, or cylindrical form with hemispherical end that is coaxial or parallel to the rotational axis of the kneading element.

6. The apparatus of claim 2, wherein one circular surface of the closed housing, across from a circular surface from which a drive shaft extends for the kneading element, has one or more holes for supply of liquid ingredients into the housing, the one or more holes located in a central region of the circular surface, within a circular track defined by ends of the kneading element.

7. The apparatus of claim 2, wherein the housing of the dough mixer and the kneading element are occasionally subjected to moving hot air introduced through a hole or nozzle and which exits through a discharge opening in the housing, the hot air generated by a drive motor of the dough mixer or from a pneumatic system and heated prior to entry, the hot air sterilizing the housing and the kneading element, loosening any bits of dough or leftover ingredients and transporting same by means of the exiting stream of air.

8. The apparatus of claim 2, wherein the kneading element of the dough mixer includes:
   a. an arm extending radially from an end of a drive shaft of the kneading element;
   b. two fixed pins, one pin being attached to each free end of the arm, the pins having a longitudinal axis parallel to the rotational axis of the kneading element; and
   c. two cylindrical sleeves, one sleeve attached to each fixed pin by an axially recessed hole allowing the sleeve to freely turn relative to the fixed pin, wherein terminal regions of each sleeve are rounded-off, round-ended, or nose cone-shaped.

9. The apparatus of claim 8, wherein the arm is fastened off-center to the drive shaft such that the two fixed pins turn with varying radius about the rotational axis of the kneading element.

10. The apparatus of claim 2, wherein the kneading element of the dough mixer includes:
    a. a plurality of arms, each extending radially along a drive shaft of the kneading element at some distance from an end of the drive shaft;
    b. a fixed pin attached to each free end of each of the plurality or arms, each fixed pin having a longitudinal axis parallel to, and not equidistant from, the rotational axis of the kneading element; and
    c. a cylindrical, freely turning sleeve attached to each fixed pin.

11. The apparatus of claim 10, wherein an inner housing wall, corresponding to the one circular surface across from the circular surface from which the drive shaft extends for the kneading element, is replaceable with a housing wall that changes the distance between the two circular surfaces, and depending on this change in distance, the sleeves are replaced by sleeves with appropriate longitudinal extension.

12. The apparatus of claim 2, wherein the dough mixer further includes a metering device having a cylindrical container with vertical longitudinal axis, the cylindrical container including:

a. a dust storage area in an upper region;
b. a metering mechanism in a lower region;
c. at least one dust stirring element operating in the upper region;
d. at least one metering stirring element operating in the lower region;
e. a distribution cone in the lower region;
f. a metering disk with a plurality of metering holes equally spaced from one another, and equally spaced from a rotational axis of the metering disk, the metering holes being located along a rim of the metering disk; and
g. a shaft that rotates coaxially with the vertical longitudinal axis of the cylindrical container to activate the dust stirring elements, the metering stirring elements, the distribution cone, and the metering disk to provide pre-determined portions of dust to the dough mixer.

13. The apparatus of claim 12, wherein the cylindrical container further includes an annular, funnel-like partition, through a central opening of which an upper part of the distribution cone extends to form an annular duct for the dust to enter the metering region.

14. The apparatus of claim 13, wherein at least one dust stirring element operates, extending radially from the distribution cone near an upper surface of the partition.

15. The apparatus of claim 12, wherein the metering disk is positioned between a fixed, level bottom plate of the cylindrical container and an annular, fixed sieve, and the bottom plate includes an outflow opening within the track of the metering holes of the rotating metering disk.

16. The apparatus of claim 15, wherein the sieve includes ducts through which the dust passes and wherein at least one metering stirring element, extending radially from the distribution cone, passes close to the sieve during rotation of the cone.

17. The apparatus of claim 12, wherein the dough mixer and the metering device can function independently of each other, and the dough mixer can function with a known metering device or the metering device can function with a known kneading device.

18. A multiple station apparatus for preparation of a pizza, the apparatus comprising:
   at least one dough mixer including:
      means for charging a mixing region with flour-like or dust-like ingredients;
      means for homogenizing and aerating the flour-like or dust-like ingredients by rotating a kneading element at a relatively high speed;
      means for introducing liquid ingredients to the flour-like or dust-like ingredients;
      means for preparing the dough by rotating the kneading element at a lower speed to form and roll the dough into clumps;
      means for forming a single, balled together dough mass by rotating the kneading element at a lowest speed; and
      means for discharging the single, balled together dough mass from the mixing region;
   at least one shaping device that shapes the dough to a flattened pizza base of pre-determined dimension;
   at least one metering and dispensing device that apportions and applies a pre-determined amount of at least one topping to the pizza base to form a pizza; and
   at least one oven that cooks the pizza.

19. A multiple station apparatus for automated preparation of a pizza, the apparatus comprising:
   a. at least one dough mixer that prepares individual and pre-determined portions of dough from flour and other component ingredients;
   b. at least one shaping device that shapes the fresh dough to a flattened pizza base of pre-determined dimension, wherein the at least one shaping device includes:
      a preformer that receives a dough ball and presses the dough ball into a dough disc;
      a dough shaping press that receives a dough disc and presses the dough disc into a pizza base; and
      a dough punching device that receives the pizza base and dimples the pizza base for uniform and expedited cooking;
   c. at least one metering and dispensing device that apportions and applies a pre-determined amount of at least one topping to the pizza base to form a pizza;
   d. at least one oven that cooks the pizza; and
   e. a transport system that transports the dough portion, the flattened pizza base and the pizza through the multiple station apparatus.

20. The apparatus of claim 19, wherein the preformer includes:
   a. a funnel shaped housing;
   b. a disc press; and
   c. a lower press plate, wherein the dough ball falls by gravity into the funnel housing, comes to rest on the lower press plate, and is pressed into the dough disc by the disc press.

21. The apparatus of claim 20, wherein the lower press plate is pre-heated to warm the dough ball and the dough disc to expedite a later, uniform cooking of the dough.

22. The apparatus of claim 20 wherein the disc press includes a disc plate shaped as an inverted cup which, when lowered to contact the dough ball, shapes the dough ball into a dough disc against the lower press plate.

23. The apparatus of claim 22, wherein the disc plate is pre-heated to warm the dough disc to expedite a later, uniform cooking of the dough.

24. The apparatus of claim 20, wherein the lower press plate of the preformer acts as a lower press plate of the dough shaping press.

25. The apparatus of claim 19, wherein the dough shaping press includes:
   a. an upper press plate; and
   b. a lower press plate, wherein the lower press plate moves vertically with the dough disc to form the pizza base by pressing the dough disc against the upper press plate.

26. The apparatus of claim 25, wherein the upper press plate is stationary, being fixedly connected to the apparatus.

27. The apparatus of claim 25, wherein the lower press plate is horizontally slidable to receive the dough disc from the preformer and to move laterally to a position under the upper press plate for pizza base formation.

28. The apparatus of claim 19, wherein the dough punching device includes:
   a. a housing slidably connected to the apparatus;
   b. a toothed punching plate fixedly connected to the housing; and
   c. a lower press plate, wherein the lower press plate raises the pizza base to dimple the pizza base against the toothed punching plate, the dimples to facilitate a later uniform and expedited cooking of the pizza base.

29. The apparatus of claim 28, wherein the housing horizontally slides to a position above the lower press plate prior to the lower press plate raising the pizza base to dimple the pizza base against the toothed punching plate.

30. The apparatus of claim 28, wherein the lower press plate is horizontally slidable and also receives the dough ball at the preformer, supports the dough ball during pressing into a dough disc, moves horizontally to a position at the dough shaping press for pizza base formation, and supports the dough disc during pizza base pressing at the dough shaping press.

31. The apparatus of claim 30, wherein the lower press plate is pre-heated to warm the dough ball, the dough disc, and the pizza base to expedite a later, uniform cooking of the dough.

32. The apparatus of claim 28, wherein the lower press plate is tilted, after pizza base dimpling, to transfer the dimpled pizza base to a conveying system for continued pizza preparation.

33. A multiple station apparatus for automated preparation of a pizza, the apparatus comprising:
   a. at least one dough mixer that prepares individual and pre-determined portions of dough from flour and other component ingredients;
   b. at least one shaping device that shapes the fresh dough to a flattened pizza base of pre-determined dimension, wherein the at least one shaping device includes:
      means for pressing a dough ball into a dough disc;
      means for pressing a dough disc into a pizza base; and
      means for dimpling the pizza base to facilitate a uniform and expedited cooking of the pizza base;
   c. at least one metering and dispensing device that apportions and applies a pre-determined amount of at least one topping to the pizza base to form a pizza,
   d. at least one oven that cooks the pizza; and
   e. a transport system that transports the dough portion, the flattened pizza base and the pizza through the multiple station apparatus.

34. A multiple station apparatus for automated preparation of a pizza, the apparatus comprising:
   a. at least one dough mixer that prepares individual and pre-determined portions of dough from flour and other component ingredients;
   b. at least one shaping device that shapes the fresh dough to a flattened pizza base of pre-determined dimension;
   c. at least one metering and dispensing device that apportions and applies a pre-determined amount of at least one topping to the pizza base to form a pizza, wherein at least one metering and dispensing device apportions liquid or cream-like components to the pizza base, wherein the metering and dispensing device distributes the liquid or cream-like component by dropping the liquid or cream-like component on the pizza base thereunder, in a spiral, by rotating and shifting radially a dispensing feed tube over the pizza base;
   d. at least one oven that cooks the pizza; and
   e. a transport system that transports the dough portion, the flattened pizza base and the pizza through the multiple station apparatus.

35. The apparatus of claim 34, wherein the pizza base is conveyed to and from the metering and dispensing device by a traditional conveyor belt or conveyor chain which stops and holds stationary the pizza base during distribution of the liquid or cream-like component, thereby allowing heat impact onto the pizza base during conveying or garnishing.

36. A multiple station apparatus for automated preparation of a pizza, the apparatus comprising:
   a. at least one dough mixer that prepares individual and pre-determined portions of dough from flour and other component ingredients;
   b. at least one shaping device that shapes the fresh dough to a flattened pizza base of pre-determined dimension;
   c. at least one metering and dispensing device that apportions and applies a pre-determined amount of at least one topping to the pizza base to form a pizza, wherein at least one metering and dispensing device apportions liquid or cream-like components to the pizza base, the metering and dispensing device including:
      a base plate with a central hole under which the pizza base is located, the hole centered about a perpendicular axis;
      a bushing, rotatably connected to the base plate, having a central bore centered about the perpendicular axis;
      a spindle fixedly connected to the bushing;
      a carnage movably connected to the spindle; and
      a tube for feeding the liquid or cream-like components, the tube being fixedly connected to the carriage, wherein during rotation of the bushing about the perpendicular axis, the carriage moves along the spindle radially relative to the perpendicular axis, and liquid or cream-like components are dispensed from the tube in a spiral on the pizza base;
   d. at least one oven that cooks the pizza; and
   e. a transport system that transports the dough portion, the flattened pizza base and the pizza through the multiple station apparatus.

37. The apparatus of claim 36, wherein the pizza base is conveyed to and from the metering and dispensing device by a traditional conveyor belt or conveyor chain which stops and holds stationary the pizza base during dispensing of the liquid or cream-like components, thereby allowing heat impact onto the pizza base during conveying or garnishing.

38. The apparatus of claim 36, wherein the spindle is threaded, the spindle rotating about its longitudinal axis to move the carriage therealong.

39. The apparatus of claim 38, wherein the threaded spindle is rotated by an annular, toothed gear mounted to the spindle, which toothed gear engages in a gear ring, the gear ring communicating with a stationary structure of the metering and dispensing device during bushing rotation to turn the spindle.

40. The apparatus of claim 36, wherein the spindle is positioned horizontally relative to the base plate and the carriage passes through the perpendicular axis during movement along the spindle.

41. The apparatus of claim 36, wherein the liquid or cream-like components are dispensed uniformly on the pizza base such that a time unit of dispensed volume of component remains constant, the uniform dispensing being achieved by altering the rotational speed of the bushing accordingly in relation to the changing radius of the spiral on the pizza base.

42. The apparatus of claim 36, wherein the liquid or cream-like components are dispensed uniformly on the pizza base such that the rotational speed of the bushing remains constant and the time unit of dispensed volume of component changes in proportion to the changing radius of the spiral of component on the pizza base, wherein a reduction of the radius causes a decrease in a time unit of dispensed volume.

43. A multiple station apparatus for automated preparation of a pizza, the apparatus comprising:
   a. at least one dough mixer that prepares individual and pre-determined portions of dough from flour and other component ingredients;
   b. at least one shaping device that shapes the fresh dough to a flattened pizza base of pre-determined dimension;
   c. at least one metering and dispensing device that apportions and applies a pre-determined amount of at least one topping to the pizza base to form a pizza, wherein at least one metering and dispensing device apportions liquid or cream-like components to the pizza base, the metering and dispensing device including:
      means for positioning the pizza base for garnishing;
      means for rotating a dispenser about an axis perpendicular to the pizza base;
      means for moving the dispenser radially relative to the perpendicular axis and parallel relative to the pizza base; and
      means for dispensing the liquid or cream-like component during steps (b) and (c), whereby the liquid or cream-like component is placed on the pizza base in a spiral;
   d. at least one oven that cooks the pizza; and
   e. a transport system that transports the dough portion, the flattened pizza base and the pizza through the multiple station apparatus.

44. A multiple station apparatus for automated preparation of a pizza, the apparatus comprising:
   a. at least one dough mixer that prepares individual and pre-determined portions of dough from flour and other component ingredients;
   b. at least one shaping device that shapes the fresh dough to a flattened pizza base of pre-determined dimension;
   c. at least one metering and dispensing device that apportions and applies a pre-determined amount of at least one topping to the pizza base to form a pizza;
   d. at least one oven that cooks the pizza, wherein the at least one oven includes:
      sources of infrared rays in the far-infrared, the visible-infrared, and the near-infrared range located in an upper portion of the oven;
      sources of infrared rays in the far-infrared range located in a lower portion of the oven, the infrared rays in the lower portion of the oven acting through openings in a plate supporting the pizza; and
      reflectors combined with the sources of infrared rays to cook the pizza; and
   e. a transport system that transports the dough portion, the flattened pizza base and the pizza through the multiple station apparatus.

45. The apparatus of claim 44, further including an induction unit in the lower portion of the oven acting on a metal structure of a plate supporting the pizza to assist in the cooking of the pizza.

46. The apparatus of claim 44, wherein the oven further includes a heat retaining housing to assist in the cooking of the pizza.

47. The apparatus of claim 44, wherein the upper portion of the oven can move vertically such that in a lowered cooking position an enclosed space is created that shields radiation acting inside the enclosed space.

48. The apparatus of claim 44, wherein the sources of infrared rays are mounted such that the sources can move vertically with or without the combined reflectors.

49. The apparatus of claim 44, further including a microwave-emitting megatron located in the upper portion of the oven to operate in conjunction with sources of infrared rays.

50. A multiple station apparatus for automated preparation of a pizza, the apparatus comprising:

at least one metering and dispensing device that apportions and applies a pre-determined amount of at least one topping to a pizza base to form a pizza;

at least one oven that cooks the pizza, wherein the at least one oven includes:

means for performing an initial heating cycle;

means for performing an intermediate heating cycle; and means for performing a final heating cycle, wherein the oven includes sources of infrared rays in the visible, the near-infrared, and the far-infrared range, wherein a cooking effect of the sources of infrared rays in the visible and the near-infrared rays predominate during the initial heating cycle, while a cooking effect of the sources of infrared rays in the far-infrared range gradually counterbalance during subsequent heating cycles.

51. A multiple station apparatus for automated preparation of a pizza, the apparatus comprising:

a. at least one dough mixer that prepares individual and pre-determined portions of dough from flour and other component ingredients;

b. at least one shaping device that shapes the fresh dough to a flattened pizza base of pre-determined dimension;

c. at least one metering and dispensing device that apportions and applies a pre-determined amount of at least one topping to the pizza base to form a pizza;

d. at least one oven that cooks the pizza;

e. a transport system that transports the dough portion, the flattened pizza base and the pizza through the multiple station apparatus; and f. a pizza cutting and transfer device including:

a plate;

at least one blade connected to the plate; and a vertical sheet connected to the plate, wherein the plate moves vertically relative to the pizza allowing the at least one blade to cut the pizza, then the plate moves horizontally relative to the pizza allowing the at least one blade and the sheet to transfer the pizza.

52. The apparatus of cliam 51, wherein the vertical sheet includes one or more vertical slots, each slot engaging a pin extending from the plate to allow the sheet to slide vertically relative to the plate when the plate moves vertically relative to the pizza and the blades cut the pizza.

53. The apparatus of claim 51, wherein the at least one blade is coated with a layer of material applied by immersion, spraying on, or as a preformed sheath, the material removable at an end of a predetermined cutting cycle or given length of time.

54. A multiple station apparatus for automated preparation of a pizza, the apparatus comprising:

a. means for receiving a programmed order for a pizza, the order specifying topping requirements as selected from available offerings;

b. means for preparing an individual dough portion from flour and other component ingredients;

c. means for shaping the dough portion to a flattened pizza base;

d. means for metering and applying toppings to the pizza base as received in the programmed order, wherein at least one metering and dispensing device apportions liquid or cream-like components to the pizza base by dropping the liquid or cream-like component on the pizza base thereunder, in a spiral, by rotating and shifting radially a dispensing feed tube over the pizza base; and e. means for cooking the pizza.

* * * * *